US010374232B2

(12) United States Patent
Frianeza-Kullberg

(10) Patent No.: US 10,374,232 B2
(45) Date of Patent: *Aug. 6, 2019

(54) COMPLEXOMETRIC PRECURSOR FORMULATION METHODOLOGY FOR INDUSTRIAL PRODUCTION OF FINE AND ULTRAFINE POWDERS AND NANOPOWDERS FOR LITHIUM METAL OXIDES FOR BATTERY APPLICATIONS

(71) Applicant: Nano One Materials Corp., Burnaby (CA)

(72) Inventor: Teresita Frianeza-Kullberg, Gastonia, NC (US)

(73) Assignee: Nano One Materials Corp., Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/842,278

(22) Filed: Mar. 15, 2013

(65) Prior Publication Data

US 2014/0272568 A1 Sep. 18, 2014

(51) Int. Cl.
| | | |
|---|---|---|
| *H01M 4/00* | (2006.01) | |
| *H01M 4/525* | (2010.01) | |
| *H01M 4/505* | (2010.01) | |
| *C01B 25/45* | (2006.01) | |
| *C01G 45/12* | (2006.01) | |
| *C01G 51/00* | (2006.01) | |
| *C01G 53/00* | (2006.01) | |
| *H01M 4/485* | (2010.01) | |

(52) U.S. Cl.
CPC ............ *H01M 4/525* (2013.01); *C01B 25/45* (2013.01); *C01G 45/1242* (2013.01); *C01G 51/42* (2013.01); *C01G 53/42* (2013.01); *C01G 53/50* (2013.01); *H01M 4/505* (2013.01); *C01P 2002/52* (2013.01); *C01P 2002/72* (2013.01); *C01P 2004/03* (2013.01); *C01P 2004/62* (2013.01); *C01P 2004/64* (2013.01); *C01P 2004/80* (2013.01); *C01P 2006/12* (2013.01); *C01P 2006/40* (2013.01); *H01M 4/485* (2013.01)

(58) Field of Classification Search
CPC ...... H01M 4/36; H01M 4/5825; H01M 4/505; H01M 4/525; H01M 4/131; H01M 10/0525; C01G 51/42; C01P 2004/62; C01P 2004/64; C01P 2004/80; C01P 2004/82; C01P 2004/84; C01P 2004/86; C01P 2004/88; C01P 2006/12
USPC .............. 423/593.1, 594.3–594.6, 306; 429/231.95, 218.1, 231.8, 231.1, 231.3; 252/182.1
See application file for complete search history.

(56) References Cited

U.S. PATENT DOCUMENTS

| | | | |
|---|---|---|---|
| 5,910,382 A * | 6/1999 | Goodenough et al. | .... 429/218.1 |
| 6,752,979 B1 | 6/2004 | Talbot et al. | |
| 6,905,516 B1 | 6/2005 | Lemaitre et al. | |
| 6,960,335 B1 * | 11/2005 | Singhal | ............... B82Y 30/00 423/594.15 |
| 7,338,647 B2 | 3/2008 | Huang et al. | |
| 7,457,018 B2 | 11/2008 | Armand et al. | |
| 7,578,457 B2 | 8/2009 | Dobbs | |
| 7,727,909 B2 | 6/2010 | Alarco et al. | |
| 7,919,068 B2 | 4/2011 | Edwards et al. | |
| 7,998,617 B2 | 8/2011 | Armand et al. | |
| 8,067,117 B2 | 11/2011 | Goodenough et al. | |
| 8,187,752 B2 | 5/2012 | Buckley et al. | |
| 8,282,691 B2 | 10/2012 | Goodenough et al. | |
| 8,329,762 B2 | 12/2012 | Chane-Ching et al. | |
| 2003/0082454 A1 | 5/2003 | Armand et al. | |
| 2003/0224168 A1 * | 12/2003 | Mack | ................ B82Y 30/00 428/408 |
| 2004/0005265 A1 * | 1/2004 | Chiang | ............ H01M 4/5825 423/306 |
| 2004/0076883 A1 * | 4/2004 | Aoshima | ............ H01M 2/021 429/223 |

(Continued)

FOREIGN PATENT DOCUMENTS

| | | |
|---|---|---|
| EP | 1 134 826 A1 | 9/2001 |
| EP | 1996531 A | 12/2008 |

(Continued)

OTHER PUBLICATIONS

Abstract of CN 102082290, Jun. 1, 2011.*
Gim et al, "Synthesis and characterization of integrated layered nanocomposites for lithium ion batteries" Nanoscale Research Letters, 7:60, pp. 1-9. (Year: 2012).*
Grigorova et al, "Soft mechanochemically assisted synthesis of nano-sized LiCoO2 with a layered structure" j. Mater. Sci., 46:7106-7113. (Year: 2011).*
Pu et al, "Enhanced overcharge performance..." Nanoscale, 4, 6743-6747. (Year: 2012).*

(Continued)

*Primary Examiner* — Steven J Bos
(74) *Attorney, Agent, or Firm* — Joseph T. Guy; Patent Filing Specialist, Inc.

(57) ABSTRACT

A compound $M_jX_p$ which is particularly suitable for use in a battery prepared by the complexometric precursor formulation methodology wherein: $M_j$ is at least one positive ion selected from the group consisting of alkali metals, alkaline earth metals and transition metals and j is an integer representing the moles of said positive ion per moles of said $M_jX_p$; and $X_p$, a negative anion or polyanion from Groups IIIA, IV A, VA, VIA and VIIA and may be one or more anion or polyanion and p is an integer representing the moles of said negative ion per moles of said $M_jX_p$.

21 Claims, 36 Drawing Sheets

(56) References Cited

U.S. PATENT DOCUMENTS

| | | | | |
|---|---|---|---|---|
| 2007/0292747 | A1* | 12/2007 | Chiang | C01B 25/45 429/52 |
| 2008/0280141 | A1* | 11/2008 | Dobbs | B82Y 30/00 428/403 |
| 2009/0035661 | A1 | 2/2009 | Swoyer et al. | |
| 2009/0148377 | A1 | 6/2009 | Moshage et al. | |
| 2009/0212267 | A1 | 8/2009 | Dobbs et al. | |
| 2009/0291368 | A1* | 11/2009 | Newman | H01M 4/29 429/245 |
| 2010/0117025 | A1* | 5/2010 | Takeuchi | H01M 4/131 252/182.1 |
| 2010/0323245 | A1 | 12/2010 | Liang | |
| 2011/0052981 | A1 | 3/2011 | Lopez et al. | |
| 2011/0085958 | A1 | 4/2011 | Swoyer et al. | |
| 2011/0274850 | A1 | 11/2011 | Yang et al. | |
| 2013/0089739 | A1* | 4/2013 | Polshettiwar | C01G 53/00 428/402 |

FOREIGN PATENT DOCUMENTS

| | | |
|---|---|---|
| EP | 1 355 853 B1 | 4/2009 |
| EP | 2 228 080 A1 | 9/2010 |
| JP | H06-168721 | 6/1994 |
| JP | 2005-97087 | 4/2005 |
| JP | 2005-332629 | 12/2005 |
| JP | 2011-515824 | 5/2011 |
| JP | 2012-505520 | 3/2012 |
| WO | WO 2005/070819 A1 | 8/2005 |
| WO | WO 2006/000049 A1 | 1/2006 |
| WO | WO 2006/119550 A1 | 11/2006 |
| WO | WO 2007/000014 A1 | 1/2007 |
| WO | WO 2007086967 A2 | 8/2007 |
| WO | WO 2007/100918 A2 | 9/2007 |
| WO | WO 2007/086967 A3 | 6/2008 |
| WO | WO 2009/076153 A1 | 6/2009 |
| WO | WO 2009/128879 A2 | 10/2009 |
| WO | WO 2010/042434 A2 | 4/2010 |
| WO | WO 2011/011582 A2 | 1/2011 |
| WO | WO 2011/031544 A2 | 3/2011 |
| WO | WO 2012/039893 A2 | 3/2012 |

OTHER PUBLICATIONS

Kang H, Myung S, Amine K, Lee S, Sun Y. Improved electrochemical properties of BiOF-coated 5 V spinel Li[Ni0.5Mn1.5]O4 for rechargeable lithium batteries. J Power Sources 2010;195:2023-8.

Wu HM, Tu JP, Chen XT, Yuan YF, Li Y, Zhao XB et al. Synthesis and characterization of LiNi0.8Co0.2O2 as cathode material for lithium-ion batteries by a spray-drying method. J Power Sources 2006;159:291-4.

Zhang L, Muta T, Noguchi H, Wang X, Zhou M, Yoshio M. Peculiar electrochemical behaviors of (1-x)LiNiO2•xLi2TiO3 cathode materials prepared by spray drying. J Power Sources 2003;117:137-42.

Chen Z, Lee D, Sun Y, Amine K. Advanced cathode materials for lithium-ion batteries. MRS Bull 2011;36:498-505.

Jeong G, Kim Y, Kim H, Kim Y, Sohn H. Prospective materials and applications for Li secondary batteries. Energy & Environmental Science 2011;4:1986-2002.

Su L, Jing Y, Zhou Z. Li ion battery materials with core-shell nanostructures. Nanoscale 2011;3:3967-83.

Whittingham M. Lithium batteries and cathode materials. Chem Rev 2004;104:4271-301.

Xu B, Qian D, Wang Z, Meng YS. Recent progress in cathode materials research fro advanced lithium ion batteries. Materials Science and Engineering: R: Reports 2012;73:51-65.

Cao Q, Zhang HP, Wang GJ, Xia Q, Wu YP, Wu HQ. A novel carbon-coated LiCoO2 as cathode material for lithiumion battery. Electrochemistry Communications 2007;9:1228-32.

Cho J, Kim T, Kim C, Lee J, Kim Y, Park B. Comparison of Al2O3- and AlPO4-coated LiCoO2 cathode materials for a Li-ion cell. J Power Sources 2005;146:58-64.

Fang T, Duh J. Effect of calcination temperature on the electrochemical behavior of ZnO-coated LiCoO2 cathode. Surface and Coatings Technology 2006;201:1886-93.

Fang T, Duh J, Sheen S. LiCoO2 cathode material coated with nano-crystallized ZnO for Li-ion batteries. Thin Solid Films 2004;469-470:361-5.

Fey GT Muralidharan P, Lu C, Cho Y. Enhanced electrochemical performance and thermal stability of La2O3-coated LiCoO2. Electrochim Acta 2006;51:4850-8.

Iriyana Y, Kurita H, Yamada I, Abe T, Ogumli Z. Effects of surface modification by MgO on interfacial reactions of lithium cobalt oxide thin film electrode. J Power Sources 2004;137:111-6.

Jung E, Park YJ. Characterization of thermally aged AlPO4-coated LiCoO2 thin films. Nanoscale Research Letters 2012;7:1-4.

Kim H-, Park B-, Myung S-, Amine K, Prakash J, Sun Y-. Electrochemical and thermal characterization of AlF3-coated Li[Ni0.8Co0.15Al0.05]O2 cathode in lithium-ion cells. J Power Sources 2008;179:347-50.

Kim KH, Iriyama Y, Yamamoto K, Kumazakli S, Asaka T, Tanabe K et al. Characterization of the interface between LiCoO2 and Li7La3Zr2O12 in an all-solid-state rechargeable lithium battery. J Power Sources 2011;196:764-7.

Kim SH, Kim C. Improving the rate performance of LiCoO2 by Zr doping. Journal of Electroceramics 2009;23:254-7.

Kim Y, Veith GM, Nanda J, Uno RR, Chli M, Dudney NJ. High voltage stability of LiCoO2 particles with a nano-scale Lipon coating. Electrochim Acta 2011;56:6573-80.

Kosova N, Devyatkina E, Slobodyuk A, Kaichev V. Surface chemistry study of LiCoO2 coated with alumina. Solid State Ionics 2008;179:1745-9.

Lee K, Myung S, Kim D, Sun Y. AlF3-coated LiCoO2 and Li[Ni1/3Co1/3Mn1/3]O2 blend composite cathode for lithium ion batteries. J Power Sources 2011;196:6974-7.

Liu GQ, Kuo HT, Liu RS, Shen CH, Shy DS, Xing XK et al. Study of electrochemical properties of coating ZrO2 on LiCoO2. J Alloys Compounds 2010;496:512-6.

Lu C, Chhen J, Cho Y, Hsu W, Muralidharan P, Fey GT. Electrochemical performance of LiCoO2 cathodes by surface modification using lanthanum aluminum garnet. J Power Sources 2008;184:392-401.

Moon S, Chang W, Byun D, Lee JK. Comparative studies on ZnO-coated and uncoated LiCoO2 cycled at various rates and temperatures. Current Applied Physics 2010;10:e122-6.

Nobilif, Croce F, Tossici R, Meschini I, Reale P, Marassi R. Sol-gel synthesis and electrochemical characterization of Mg-/Zr-doped LiCoO2 cathodes for Li-ion batteries. J Power Sources 2012;197:276-84.

Okubo M, Hosono E, Kudo T, Zhou HS, Honmai. Size effect on electrochemical property of nanocrystalline LiCoO2 synthesized from rapid thermal annealing method. Solid State Ionics 2009;180:612-5.

Pu X, Yin L, Yu C. Functional surface modifications on nanostructured LiCoO2 with lithium vanadates. Journal of Nanoparticle Research 2012;14:788.

Scott ID, Jung YS, Cavanagh AS, An Y, Dillon C, George SM et al. Ultrathin Coatings on Nano-LiCoO2 for Li-Ion Vehicular Applications. Nano Letters 2011;11:414-8.

Sun Y-, Cho S-, Myung S-, Amine K, Prakash J. Effect of AlF3 coating amount on high voltage cycling performance of LiCoO2. Electrochim Acta 2007;53:1013-9.

Sun Y-, Han J-, Myung S-, Lee S-, Amine K. Significant improvement of high voltage cycling behavior AlF3-coated LiCoO2 cathode. Electrochemistry Communications 2006;8:821-6.

Valanarasu S, Chandramohan R, Thirumalali J, Vijayan TA. Structural and electrochemical investigation of Zn-doped LiCoO2 powders. Ionics 2012;18:39-45.

Valanarasu S, Chandramohan R, Thirumalali J, Vijayan TA, Srikumar SR, Mahalingam T. Effect of Mg doping on the properties of combustion synthesized LiCoO2 powders. Journal of Materials Science-Materials in Electronics 2010;21:827-32.

Xu HY, Xie S, Zhang CP, Chen CH. Improving the electrochemical behavior of LiCoO2 electrode by mixed Zr—Mg doping. J Power Sources 2005;148:90-4.

(56) References Cited

OTHER PUBLICATIONS

Yang Z, Qiao Q, Yang W. Improvement of structural and electrochemical properties of commercial LiCoO2 by coating with LaF3. Electrochim Acta 2011;56:4791-6.
Yi T, Shu J, Wang Y, Xue J, Meng J, Yue C et al. Effect of treated temperature on structure and performance of LiCoO2 coated by Li4Ti5O12. Surface and Coatings Technology 2011;205:3885-9.
Zhao H, Gao L, Qiu W, Zhang X. Improvement of electrochemical stability of LiCoO2 cathode by a nano-crystalline coating. J Power Sources 2004;132:195-200.
Chang H, Sheu C, Cheng S, Wu H, Guo Z. Synthesis of Li1.1Ni1/3Co1/3Mn1/3O2 cathode material using spray-microwave method. J Power Sources 2007;174:985-9.
Choi J, Manthiram A. Comparison of the electrochemical behaviors of stoichiometric LiNi1/3Co1/3Mn1/3O2 and lithium excess Li-1.03(Ni1/3Co1/3Mn1/3)(0.97)O-2. Electrochemical and Solid State Letters 2004;7:A365-8.
Dou S, Wang W. Synthesis and electrochemical properties of layered LiNi0.5-x Mn0.5-x Co2x O2 for lithium-ion battery from nickel manganese cobalt oxide precursor. Journal of Solid State Electrochemistry Feb. 2011;15:399-404.
Guo Z, Liu H, Liu H, Dou S. Characterization of layered Li[Ni1/3Mn1/3Co1/3]O-2 cathode materials prepared by spray-drying method. Journal of New Materials for Electrochemical Systems 2003;6:263-6.
Hassoun J, Lee K, Sun Y, Scrosatli B. An Advanced Lithium Ion Battery Based on High Performance Electrode Materials. J Am Chem Soc 2011;133:3139-43.
Ju SH, Kang YC. The characteristics of Ni—Co—Mn—O precursor and Li(Ni1/3Co1/3Mn1/3)O2 cathode powders prepared by spray pyrolysis. Ceram Int 2009;35:1205-10.
Kim H, Myung S, Lee JK, Sun Y. Effects of manganese and cobalt on the electrochemical and thermal properties of layered Li[Ni0.52Co0.16+xMn0.32-x]O2 cathode materials. J Power Sources 2011;196:6710-5.
Kim J, Kumagai N, Cho T. Synthesis, structure, and electrochemical characteristics of overlithiated Li1+x (NizCo1-2zMnz)(1-x)O-2 (z=0.1-0.4 and x=0.0-0.1) positive electrodes prepared by spray-drying method. J Electrochem Soc 2008;155:A82-9.
Kim J, Kumagai N, Chung H. Improved electrochemical properties and structural stability of overlithiated Li1+x (Ni1/3Co1/3Mn1/3)(1-x)O-2 prepared by spray-drying method. Electrochemical and Solid State Letters 2006;9:A494-8.
Kim J, Kumagali N, Kadoma Y, Yashiro H. Synthesis and electrochemical properties of lithium non-stoichiometric Li1+x(Ni1/3Co1/3Mn1/3)O2+δ prepared by a spray drying method. J Power Sources 2007;174:4739.
Kim J, Kumagai N, Komaba S. Improved electrochemical properties of Li1+x(Ni0.3Co0.4Mn0.3)O2-δ (x=0, 0.03 and 0.06) with lithium excess composition prepared by a spray drying method. Electrochim Acta 2006;52:1483-90.
Labrinli M, Saadoune I, Almaggoussi A, Elhaskouri J, Amoros P. The LiyNi0.2Mn0.2Co0.6O2 electrode materials: A structural and magnetic study. Mater Res Bull 2012;47:1004-9.
Li D, Ito A, Kobayakawa K, Noguchi H, Sato Y. Structural and electrochemical characteristics of LiNi0.5-xCo2xMn1.5-xO4 prepared by spray drying process and post-annealing in O2. J Power Sources 2006;161:1241-6.
Li D, Kato Y, Kobayakawa K, Noguchi H, Sato Y. Preparation and electrochemical characteristics of LiNi1/3Mn1/3Co1/3O2 coated with metal oxides coating. J Power Sources 2006;160:1342-8.
Li D, Noguchi H, Yoshio M. Electrochemical characteristics of LiNi0.5-xMn0.5-xCo2xO2 (0 < x ≤ 0.1) prepared by spray dry method. Electrochim Acta 2004;50:427-30.
Lin B, Wen Z, Gu Z, Huang S. Morphology and electrochemical performance of Li[Ni1/3Co1/3Mn1/3]O2 cathode material by a slurry spray drying method. J Power Sources 2008;175:564-9.
Liu Z, Hu G, Peng Z, Deng X, Liu Y. Synthesis and characterization of layered Li(Ni1/3Mn1/3Co1/3)O2 cathode materials by spray-drying method. Transactions of Nonferrous Metals Society of China 2007;17:291-5.
Martha SK, Nanda J, Veith GM, Dudney NJ. Electrochemical and rate performance study of high-voltage lithium-rich composition: Li1.2Mn0.525Ni0.175Co0.1O2. J Power Sources 2012;199:220-6.
Myung S, Izumi K, Komaba S, Yashiro H, Bang HJ, Sun Y et al. Functionality of Oxide Coating for Li[Li0.05Ni0.4Co0.15Mn0.4]O2 as Positive Electrode Materials for Lithium-Ion Secondary Batteries . The Journal of Physical Chemistry C 2007;111:4061-7.
Park S, Oh SW, Sun Y. Synthesis and structural characterization of layered Li[Ni1/3+-xCo1/3Mn1/3-2xMox]O2 cathode materials by ultrasonic spray pyrolysis. J Power Sources 2005;146:622-5.
Rao CV, Reddy Alm, Ishikawa Y, Ajayan PM. LiNi1/3Co1/3Mn1/3O2-Graphene Composite as a Promising Cathode for Lithium-Ion Batteries. Acs Applied Materials & Interfaces 2011;3:2966-72.
Shaju K, Rao G, Chowdari B. Influence of Li-ion kinetics in the cathodic performance of layered Li(Ni1/3Co1/3Mn1/3)O-2. J Electrochem Soc 2004;151:A1324-32.
Smart MC, Whitacre JF, Ratnakumar BV, Amine K.. Electrochemical performance and kinetics of Li1+x(Co1/3Ni1/3Mn1/3)1-xO2 cathodes and graphite anodes in low-temperature electrolytes. J Power Sources 2007;168:501-8.
Sun Y, Myung S, Kim M, Prakash J, Amine K. Synthesis and Characterization of i[(Ni0.8Co0.1Mn0.1)0.8(Ni0.5Mn0.5)0.2]O2 with the Microscale Core-Shell Structure as the Positive Electrode Material for Lithium Batteries. Journal of the American Chemical Society 2005;127:13411-8.
Sun Y, Lee M, Yoon CS, Hassoun J, Amine K, Scrosati B. The Role of AlF3 Coatings in Improving Electrochemical Cycling of Li-Enriched Nickel-Manganese Oxide Electrodes for Li-Ion Batteries. Adv Mater 2012;24:1192-6.
Tang Z, Wang Z, Li X, Peng W. Influence of lithium content on the electrochemical performance of Li1+x(Mn0.533Ni0.233Co0.233)1-xO2 cathode materials. J Power Sources 2012;208:237-41.
Wang J, Yao X, Zhou X, Liu Z. Synthesis and electrochemical properties of layered lithium transition metal oxides. Journal of Materials Chemistry 2011;21:2544-9.
Wang J, Yuan G, Zhang M, Qiu B, Xia Y, Liu Z. The structure, morphology, and electrochemical properties of Li1+xNi1/6Co1/6Mn4/6O2.25+x/2 (0.1 ≤ x ≤ 0.7) cathode materials. Electrochim Acta 2012;66:61-6.
Wang J, Zhang M, Tang C, Xia Y, Liu Z. Microwave-irradiation synthesis of Li1.3NixCoyMn1-x-yO2.4 cathode materials for lithium ion batteries. Electrochim Acta 2012;80:15-21.
Wang T, Liu Z, Fan L, Han Y, Tang X. Synthesis optimization of Li1 + x[Mn0.45Co0.40Ni0.15]O2 with different spherical sizes via co-precipitation. Powder Technol 2008;187:124-9.
Yue P, Wang Z, Peng W, Li L, Chen W, Guo H et al. Spray-drying synthesized LiNi0.6Co0.2Mn0.2O2 and its electrochemical performance as cathode materials for lithium ion batteries. Powder Technol 2011;214:279-82.

* cited by examiner

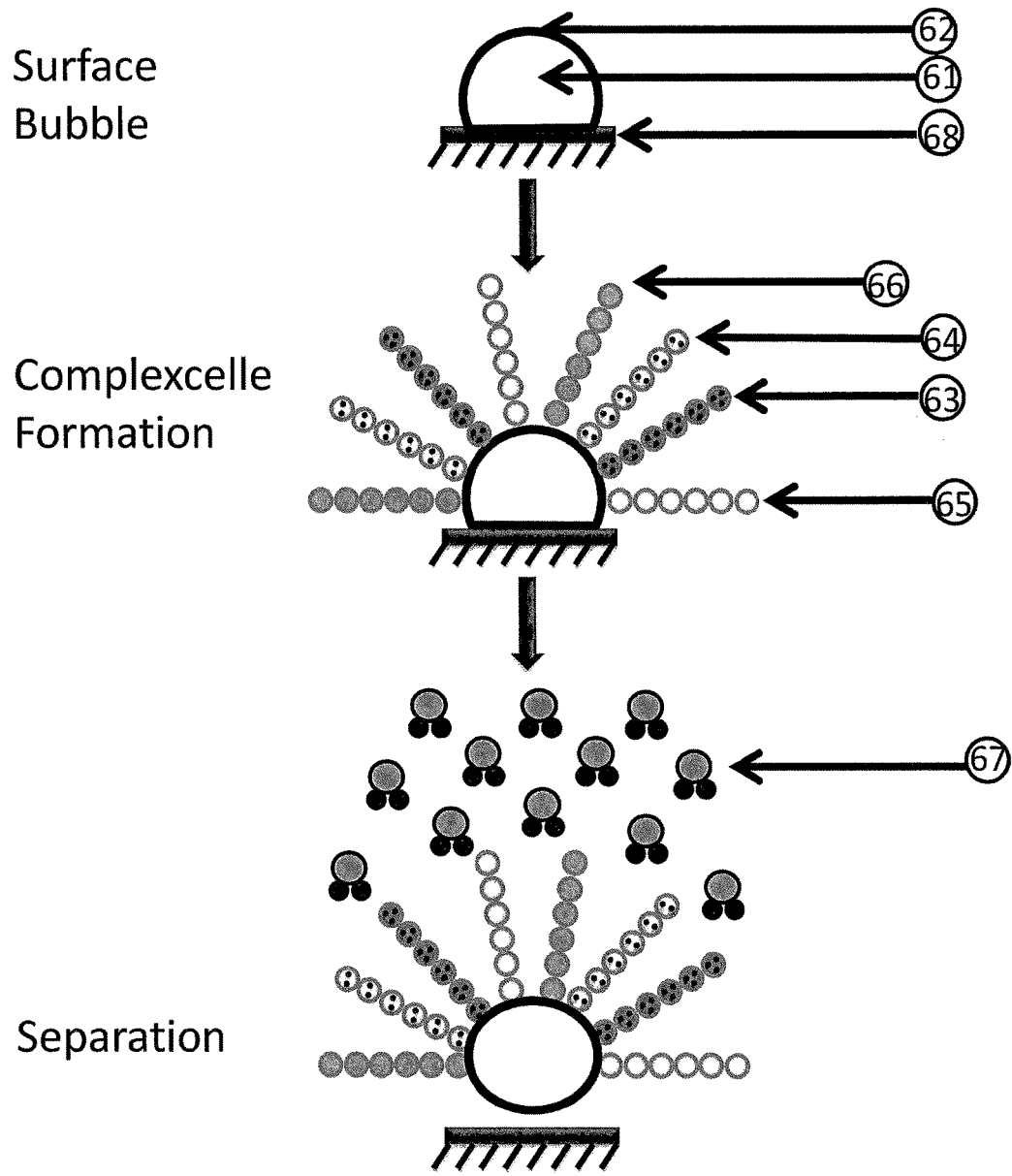

COMPLEXOMETRIC PRECURSOR FORMULATION METHODOLOGY FOR INDUSTRIAL PRODUCTION OF FINE AND ULTRAFINE POWDERS AND NANOPOWDERS FOR LITHIUM METAL OXIDES FOR BATTERY APPLICATIONS

BACKGROUND

The present application is related to an improved method of forming fine and ultrafine powders and nanopowders. More specifically, the present invention is related to the formation of fine and ultrafine powders and nanopowders through complexometric precursors formed on bubble surfaces. Furthermore, this invention describes the preparation of lithium metal oxide by complexometric precursors that have excellent physical and chemical properties required for high performance battery applications.

Our present society is advancing very rapidly in new technologies especially in the areas of biotechnology, medicine, electronics, pharmaceuticals and energy. These require significant improvements in raw material processing and in the production of high performance products of advanced chemical formulations without compromising cost relative to commercial scale-up for industrial production (FIG. 1). Thus, this requires a combination of structure-processing-property correlations that will lead to specialized high performance materials in order to sustain these modern technically demanding criteria.

Starting with a desired specific application, the process must be tailored to obtain the characteristics, both physical and chemical, in order to meet the end performance result. It is imperative to uniquely combine both well-established properties of the compounds and/or raw materials with the new, unique, unusual or desirable properties of the advanced materials. For example, traditional ceramics are well-known to be electrical insulators yet it is possible to utilize this property such that the special ceramics will provide high thermal conductivity allowing their use as heat sinks in substrates for microelectronics. Ceramic composites of inorganic glass fibers and plastics have been used for thermal and sound insulation traditionally but now are also used as optical fibers replacing the traditional copper wire. Ceramic engines replacing the traditional steel engines can withstand higher temperatures and will burn energy more effectively. This requires that the ceramics used for engine manufacture be of very fine particles such that strength and toughness to withstand the elevated temperatures and ruggedness required for these applications. Furthermore, nanosize powders when fabricated into the ceramic parts for these vehicles will be more dense, have less defects, and can be fabricated in thinner and smaller, lightweight sizes for practical use.

Increased energy consumption today necessitates discovery of new resources but also improvement in current materials to satisfy the energy infrastructure such as solar cells, fuel cells, biofuels, and rechargeable batteries. For example, the lithium ion battery that has been in use in consumer electronic devices but is now commanding a significant role in larger transport vehicles. These alternative energy resources must be more practical, and price competitive with fossil fuels, for wider acceptability in high-performance applications. As a consequence, sophisticated devices require specially designed microstructures that will enhance the physical and chemical properties of the materials utilized. Often, these materials are more expensive to produce on an industrial scale. Furthermore, these specialty powdered materials such as oxides, phosphates, silicates and the like, require not only a nanosize material but also a narrow particle size distribution with high porosity, high surface area and other characteristics to achieve enhanced performance. For instance, a nanostructured lithium cathode powder for the lithium ion battery would be expected to have improved mass and charge transport due to shorter diffusion paths and higher amount of active sites resulting from its finer smaller particle size. However, this added cost for the added value may not be acceptable to the end consumer resulting in reduced sales.

Other challenges are medical applications such as the use of calcium phosphate for bone substitution. While several calcium phosphate powders are available in the market, the requirements of less than one micron discrete particles as described in U.S. Pat. No. 8,329,762 B2 are important for making a biocompatible synthetic bone. U.S. Pat. No. 5,714,103 describes bone implants based on calcium phosphate hydraulic cements, called CHPCs, made of a succession of stacked layers with a macroporous architecture mimicking the natural porosity of spongious bone. This medical field would definitely benefit from improved powders with better performance and lower cost. Another example is a dermal patch wherein the pharmaceutical drug is released to the body. Both dermal patch and drug material combined would be more compatible if their particle sizes were nanosize with narrow particle size distribution. Nanopowders can also significantly impact high performance dental applications, for example, such as teeth filling materials as well as enamel coating materials to aesthetically enhance and strengthen the tooth structure. In order to widen the usage of nanomaterials in the medical field, both cost and performance value should be compatible to both producer and end-user.

Distinctive characteristics clearly differentiate between advanced materials and traditional materials in several aspects, notably in raw materials, processing, chemical and physical characteristics, novel applications and specialized markets. Conventional powder processes are made without strict chemical control and are generally made from grinding and segregating naturally occurring materials through physical means. These result in neither ultrapure nor ultrahomogeneous particles such that fabrication of a product using such heterogeneous and impure substances gives grain boundary impurities that may reduce mechanical strength or optical deformations and other limitations. Chemical processing solves this problem by controlling the composition of the powder at the molecular level to achieve a special ultrastructure for the preferred performance application. Specialized properties such as conductivity, electrochemical capacity, optical clarity, dielectric value, magnetic strength, toughness and strength are met only with specialized processing methods to control microstructure. However, these demands necessitate an economically commercial viable process for large scale production. The dual requirements of cost and performance must be met to successfully commercialize these advanced materials.

A significant improvement in available raw materials is needed to meet many objectives. One objective is high purity, no longer 90% but >99% and even 99.999%, which entails chemical processing to remove undesirable impurities that affect performance. Another objective is particle size which preferably has a narrow, homogeneous particle size distribution with finer particle sizes of no longer 50 microns but 1 micron and preferably, nanosize. The addition of dopants which are deemed to enhance the specialized properties, like electronic conductivity and others, must be homogeneously distributed but also preferably distributed on the surface of the powder in some applications. Cobalt, aluminum and gadolinium are suitable dopants. Other dopants include Ti, Zr, Mg, Ca, Sr, Ba, Mg, Cr and B.

Innovations in processing these advanced materials to the final product are also necessary. As such, combinations of different processing techniques are often utilized. For example, inorganic powders have been usually made by traditional ceramics like solid state sintering. However, the resulting powder obtained by this method alone generally has a wider and larger particle size distribution. To obtain a homogeneous nanosize distribution, several grinding and milling steps have been employed. The generic types are ball mills, rod mills, vibratory mills, attrition mills, and jet mills. Disadvantages of these methods include energy and labor intensive production cycles and possibility of contamination from grinding balls utilized. Defects in the microstructure also occur causing degradation in the required performance targets. Chemical vapor deposition, emulsion evaporation, precipitation methods, hydrothermal synthesis, sol-gel, precipitation, spray drying, spray pyrolysis and freeze drying are some of the other methods used for these types of preparations, each with advantages and disadvantages.

The technical drivers today call for particles less than one micron, and even to less than 100 nanometers. To date, the significance of the initial powder synthesis steps have been overlooked but these initial reactions clearly define the final finished powder microstructure and also determines scalability controls and finally, cost and performance. Careful selection of the starting reactants and the media—solid, liquid or gas—plays a unique role in the formulation of low cost, high performance powders.

An example is the formation of colloidal consolidated structures by initial dispersion of particles in a liquid medium. When the particle concentration is low, dispersed colloidal suspensions can be used to eliminate flow units larger than a certain size through sedimentation or classification. The surface chemistry of the particles can be modified through the adsorption of surfactants. The mixing of multiphase systems can be achieved at the scale of the primary particle size. Once the desired modifications are achieved, the transition from dispersed to consolidated structure is accomplished by either increasing the particle-particle attraction forces, such as by flocculation, or by increasing the solids content of the suspension for forced flocculation. This whole process results in going from a fluid state ("slip") to a solid phase transition ("cast"). While this has been found to occur in the micron to sub-micron size range, highly concentrated suspensions with nanometer size particles have not been as successful. Thus, some innovation is needed in traditional colloidal techniques in order to achieve nanosize powders.

Such nanoparticles possess crystalline properties and other nanoscale features that dramatically result in unique mechanical, magnetic, thermal, optical, biological, chemical and electrical properties. Considerable growth is expected in all these markets. Therefore, achievement of an economically viable industrial production of these specialized materials entails innovations in conventional processing techniques and distinct improvements in present industrial equipment.

Traditionally, powders are made using a solid state route. By this method, the raw materials are ground and milled to the same size and with a narrow size distribution, blended and fired to obtain the final product as shown:

A solid+B→solid C solid product

In U.S. Pat. No. 6,277,521 B1, Manev et al. describe the preparation of lithium metal oxides such as $LiNi_{1-x}Co_yM_\alpha M'_\beta O_2$ where M is Ti or Zr and M' is Mg, Ca, Sr, Ba, and combinations thereof. To prepare $LiNi_{0.7}Co_{0.2}Ti_{0.05}Mg_{0.05}O_2$, stoichiometric amounts off LiOH, NiO, $Co_3O_4$, $TiO_2$ and $Mg(OH)_2$ are weighed, mixed and fired for 10 hours at 550° C. followed for an additional 10 hours at 800° C. Milling after the firing step is done to produce the fine powders of micron size. Furthermore, to obtain a narrow particle distribution, sizing selection is also done in line with the milling step. Larger size fractions are then re-milled.

One of the problems with obtaining nanopowders via the solid state method is the considerable milling process that can be time and labor intensive. The quality of the final product is a function of time, temperature and milling energy. Achieving nanometer grain sizes of narrow size distribution requires relatively long processing times in smaller batches, not just for the final sintered product but also for the starting materials, as these materials should have particle sizes within the same distribution for them to blend more homogeneously in order to have the right stoichiometry in the final product. Hence, it may become necessary to correct the stoichiometries of the final product after firing by reblending additional starting raw materials and then refiring. As a result, successive calcinations make the processing time longer and more energy intensive which increases production cost. Production of nanopowders by mechanical attrition is a structural decomposition of the coarser grains by severe plastic deformation instead of by controlled cluster assembly that yields not only the right particle size and the required homogeneous narrow size distribution but also significant nanostructures or microstructures needed for effective performance benchmarks. As such, some higher performance standards required for specialized applications are not attained. C. C. Koch addresses these issues in his article "Synthesis of Nanostructured Materials by Mechanical Milling Problems and Opportunities", Nanostructured Materials, Vol. 9, pp 13-22, 1997.

Obtaining fine powders and nanopowders by milling has improved with modern grinding machines such as stirred ball mills and vibration mills for wet grinding or jet mills for dry grinding processes. However, achieving a narrow particle size distribution still remains a difficult task today. Classifiers have to be integrated with the milling system and this repetitive sizing and milling procedures increase the processing time in making fine powders and even much longer for nanopowders. Another drawback is potential contamination of the final product from the milling media used. U.S. Pat. No. 7,578,457 B2, to R. Dobbs uses grinding media, ranging in size from 0.5 micron to 100 mm in diameter, formed from a multi-carbide material consisting of two or more carbide forming elements and carbon. These elements are selected from the group consisting of Cr, Hf, Nb, Ta, Ti, W, Mo, V, Zr. In US Patent Application No. 2009/0212267 A1, a method for making small particles for use as electrodes comprises using a first particle precursor and a second particle precursor, milling each of these precursors to an average size of less than 100 nm before reacting to at least 500° C. As an example, to make lithium iron phosphate, one precursor is aluminum nitrate, ammonium dihydrogen phosphate and the like and the other precursor is lithium carbonate, lithium dihydrogen phosphate and the like. In US Patent Application No. 2008/0280141 A1, grinding media with density greater than 8 g/mL and media size from 75-150 microns was specially made for the desired nanosize specification and the hardness of the powder to be milled. The premise is that finer, smaller size, specialized grinding media can deliver the preferred nanosize particles. Time and energy consumption are high using this modified solid state route to nanopowders. Moreover, after milling, the grinding media and the nanopowders must be separated. Since nanopowders are a health risk if inhaled, the separation will have to be done under wet conditions. The wet powders will then have to be dried again which adds to the number of processing steps.

Chemical vapor deposition, physical vapor deposition, plasma synthesis are all synthesis of powders in the gas phase. In this process, the starting raw materials are vaporized in the gas phase then collected in a cooling step on a chosen substrate. Controlled nucleation yields excellent powders that easily meet the rigorous requirements for specialized applications but the cost of the energy source and the equipment required for this method can significantly impact the final cost of the powder. More information on these processes is discussed by H. H. Hahn in "Gas Phase Synthesis of Nanocrystalline Materials, "Nanostructured Materials, Vol. 9, pp 3-12, 1997. Powders for the semiconductor industry are usually made by this type of processing.

In U.S. Pat. No. 8,147,793 B2, S. Put et al. disclose a method of preparing nano-sized metal bearing powders and doped powders by using a non-volatile metal bearing precursor and dispersing this precursor in a hot gas stream. This hot gas stream may be generated by a flame burner or a DC plasma arc with nitrogen as a plasma gas, for example. Thus, coarse size ZnO powder that is injected is reduced to Zn vapor. When air is introduced, Zn is oxidized to ZnO with nano-size particles.

Among the wet solution methods for fine powder synthesis are precipitation, sol-gel, and variants of these using complexing agents, emulsifiers and/or surfactants. In WO 2010/042434 A2, Venkatachalam et al. describe a co-precipitation process involving metal hydroxides and sol-gel approaches for the preparation of $Li_{1+x}Ni_\alpha Mn_\beta Co_\gamma M_\delta O_{2=\alpha}F_z$ where M is Mg, Zn, Al, Ga, B, Zr, Ca, Ce, Ti, Nb or combinations thereof. In one example cited, stoichiometric amounts of nickel acetate, cobalt acetate, and manganese acetate were dissolved in distilled water to form a mixed metal acetate solution under oxygen-free atmosphere. This mixed metal acetate solution was added to a stirred solution of lithium hydroxide to precipitate the mixed metal hydroxides. After filtration, washing to remove residual Li and base, and drying under nitrogen atmosphere, the mixed metal hydroxides were mixed with the appropriate amount of lithium hydroxide powder in a jar mill, double planetary mixer or a dry powder mixer. The mixed powders were calcined at 400° C. for 8 hours in air, cooling, additional mixing, homogenizing in the mill or mixer, and then recalcined at 900° C. for 12 hours to form the final product $Li_{1.2}Ni_{0.175}Co_{0.10}Mn_{0.525}O_2$. The total time from start to finish for their method is 20 hours for the calcination step alone plus the cooling time, the times for the initial mixed metal hydroxide precipitation, milling and blending to homogenize, and the filtration and washing steps. All these process steps add up to a calcination time of 20 hours excluding the cooling time for the furnace and the time from the other processing steps which will have a combined total of at least 30 hours or more. Furthermore, in their process, the second part after the co-precipitation is a solid state method since the mixed metal hydroxides and the lithium hydroxides are mixed and then fired. The final calcined powder size obtained from a solid state route is usually in the micron size range which will entail additional intensive milling to reduce the particles to a homogeneous narrow size distribution of nanopowders. This processing has numerous steps to obtain the final product which can impact large scale production costs.

Another example of co-precipitation is described in U.S. Pat. No. 6,241,959 B1. Nitrates of nickel, cobalt and magnesium were mixed in a mole ratio of 0.79:0.19:0.02 and dissolved in solution. Aqueous ammonia was added to precipitate the hydroxides and the pH was further adjusted using 6M NaOH till pH 11. After 6 hours of addition time, the Ni—Co composite hydroxide was separated. Lithium hydroxide was mixed with this Ni—Co hydroxide and heated to 400° C. and maintained at this temperature for 6 hours. After cooling, the product was then reheated to 750° C. for 16 hours. The battery cycling test was done at a low C rate of 0.2 C. Discharge capacity was 160 mAh/g. Only 30 cycles were shown. Note that the coprecipitation process is only for the Ni—Co hydroxides. The second part of this process is a solid state synthesis where the starting raw materials, Ni—Co hydroxide and the lithium hydroxide are mixed and then fired. The addition of NaOH to raise the pH to 11 as well as provide a source of hydroxide ions would leave residual Na ions in the final product unless the excess $Na^+$ is washed off. This excess $Na^+$ will affect the purity of the material and have some deleterious effect in the battery performance. The total process time is 6 hours addition time for the co-precipitation step, 22 total hours for the holding time at the two heating steps and additional time for the other steps of cooling, separating, mixing and others which sums up to at least 40 hours of processing time.

Sol-gel synthesis is a variant of the precipitation method. This involves hydrolysis followed by condensation to form uniform fine powders. The raw materials are expensive and the reaction is slow since the hydrolysis-condensation reactions must be carefully controlled. Alkoxides are usually the choice and these are also air sensitive; thus requiring the reactions to be under controlled atmosphere.

Hydrothermal synthesis has also been used to prepare these powders. This involves crystallization of aqueous solutions at high temperature and high pressures. An example of this process is disclosed in US Patent Publication No. 2010/0227221 A1. A lithium metal composite oxide was prepared by mixing an aqueous solution of one or more transition metal cations with an alkalifying agent and another lithium compound to precipitate the hydroxides. Water is then added to this mixture under supercritical or subcritical conditions, dried then followed by calcining and granulating then another calcining step to synthesize the lithium metal oxide. The water under supercritical or subcritical conditions has a pressure of 180-550 bar and a temperature of 200-700° C.

The use of agents like emulsifiers, surfactants, and complexing agents to form nanosize powders has been demonstrated. In microemulsion methods, inorganic reactions are confined to aqueous domains called water-in-oil or surfactant/water/oil combination. A problem is separation of the product particle from the oil since filtration of a nanosize particle is difficult. Reaction times are long. Residual oil and surfactant that remain after the separation still have to be removed by other means such as heating. As a result, the batch sizes are small.

A variety of structures are formed by the surfactant with another particle dispersed in solution. Micelles are formed at high concentrations of the surfactant and the micelle diameter is determined by the length of the surfactant chain which can be from 20-300 angstroms. U.S. Pat. No. 6,752,979 B1 describes a way of making metal oxide particles with nano-sized grains using surfactants. A concentrated aqueous solution of at least one or more metal cations of at least 90% of its solubility is mixed with surfactant to form micelles at a given temperature. Optionally, this micellar liquid forms a gel. This mixture is heated to form the metal oxide and remove the surfactant. A disadvantage is the long heat treatment times.

U.S. Pat. No. 6,383,285 B1 discloses a method for making cathode materials for lithium ion batteries using a lithium salt, a transition metal salt, and a complexing agent in water then removing water by spray-drying to form a precursor. These complexing agents were citric acid, oxalic acid, malonic acid, tartaric acid, maleic acid and succinic acid. The use of these agents increases the processing cost of the product. The precursor is formed from the lithium, transition metal and the complexing agent after spray drying. Battery capacities were only given for the first cycle. The C-rate was not defined. For electric vehicle applications, lithium ion battery performance at high C-rate for many cycles is an important criterion.

A method for making lithium vanadium phosphate was described in US Patent Publication No. 2009/0148377 A1. A phosphate ion source, a lithium compound, $V_2O_5$, a polymeric material, solvent, and a source of carbon or organic material were mixed to form a slurry. This wet blended slurry was then spray dried to form a precursor which was then milled, compacted, pre-baked and calcined for about 8 hours at 900° C. The particle size after spray drying was about 50-100 microns. The final product was milled to 20 microns using a fluidized bed jet mill.

Nanosize $Li_4Ti_5O_{12}$ was prepared by preparing this lithium titanate as a first size between 5 nm to 2000 nm as described in U.S. Pat. No. 6,890,510 B2 from a blend of titanium and lithium, evaporating and calcining this blend, milling this powder to a finer size, spray drying then refiring this lithium titanate, then milling again. There are several milling and firing sequences in this process to obtain the nanosize desired which increase the number of processing steps which consequently increases the cost of processing.

Lithium ion batteries have proven their commercial practicality since the early 1990s when Sony first introduced this battery for its consumer electronics. The cathode material used then was lithium cobalt oxide whose layered structure allowed the Li+ ions to effectively intercalate between the cathode and the anode. Moreover, the battery was lightweight and without any memory effect, compared with the other rechargeable batteries like the NiCd or the NiMH batteries. Its energy density was 3-4 times more than currently available rechargeable batteries.

The start of commercialization of the lithium ion battery using lithium cobalt oxide has benefited many applications. Its reputation for safety in consumer devices has promoted other potential applications, most notably in the transportation industry. Our current consumption of oil has increased significantly and such dependence has spurred more investigation into alternative sources of energy. That direction focused into developing the lithium ion battery for high load, high power applications and this required developing and investigating new materials for use as a cathode for the lithium ion battery. Attention was generated towards research into the cost, safety and reliability of lithium cathode materials.

The first row of transition metals and those similar to the cobalt ion in chemical and physical properties were Ni, Mn and Fe as well as V. These compounds were synthesized generally using the traditional solid state route. Nickel is a good substitute for cobalt and has a layered structure. Its use in the NiCd and NiMH rechargeable batteries has proven its capability. However, its excellent conductivity also caused some safety problems in the lithium ion battery. Cobalt is an expensive metal but has proven reliability by its established battery performance in commercial lithium ion batteries for many years. Manganese, as a spinel structure $LiMn_2O_4$, is least expensive but it has a disadvantage of not having high conductivity. Iron as $LiFeO_2$ did not have the battery performance required but as olivine structure $LiFePO_4$, it has proven its use in high power applications. A layered-layered structure,

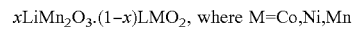

$xLi_2MnO_3 \cdot (1-x)LMO_2$, where M=Co,Ni,Mn has taken considerable interest since it has exhibited good battery performance. Other research is ongoing extensively on combinations of Co, Ni, Mn and Fe, including the addition of dopants or coatings to create some surface modifications that would lead to thermal stability and/or chemical stability which would then extend cycle life.

Today, synthesizing an alternative lithium metal oxide or other lithium metal compound as cathode material for electric vehicle applications remains a chemical challenge. The transportation requirements are significantly more demanding than consumer electronic devices. These issues include cycle life especially under extreme temperature conditions, charging times, miles driven per charge, miles driven per charge per speed, total vehicle battery cost, battery cycle life, durability, and safety. The preferred lithium cathode material will have to be produced industrially in large scale. Therefore, the processing conditions must produce the physical and chemical characteristics of this preferred lithium cathode material at low cost. Starting materials should be of high purity, preferably with low Na, Cl and S and other contaminants detrimental to the battery yet be low cost. Production equipment must be currently available equipment already in use with novel innovations easily implemented. Finally, the number of processing steps should be decreased as well as be less energy and labor intensive.

The desired properties of this preferred lithium cathode material are; namely: 1.) high capacity, 2.) long cycle life, 3.) high stability, 4.) fast charging rate, 5.) low cost. The physical properties should include the following; namely: 1.) fine particle size, 2.) narrow particle size distribution, 3.) uniform morphology, 4.) high purity, 5.) high surface area, 6.) optimum degree of crystallization, 7.) minimum defects and 8.) minimum agglomeration. In order to achieve all these at low cost or acceptable consumer cost requires a balance in the preparation of this preferred lithium cathode. Nanoparticles have been of significant interest but the cost of achieving nanosize powders remains a significant cost in production.

This invention aims to achieve this preferred high performance lithium cathode material by using the complexometric precursor formulation methodology in the synthesis of this lithium cathode material. The results described in this invention show that the materials produced by a complexcelle formed during the CPF process outperform cathodes currently in commercial use. The objective is to industrially and cost-effectively produce these preferred lithium cathode nanomaterials for energy storage systems by the complexometric precursor formulation methodology. As such, new avenues in battery technology will open and be easily commercialized. Furthermore, these novel nanomaterials will have an impact in other future energy systems and other potential applications in other industries.

SUMMARY OF THE INVENTION

It is the objective of this invention to describe an economically scalable process useful for several high value-added inorganic powders tailored to meet the desired performance specifications. It is a further objective of this invention to produce the selected narrow size particle distribution of these powders and to produce the desired particle size needed for the selected application, such size ranging from fine micron size particles to ultrafine powders and the nanosize powders. It is also the objective of this invention to produce these powders that meet or exceed the performance of presently available materials. It is the objective of this invention to prepare lithium metal oxide powders by complexometric precursor formulation methodology to achieve tailored physical and chemical properties for high performance lithium battery applications.

It is an object of this invention to provide a methodology for industrial production of special fine, ultrafine and nano powders without compromising performance.

A particular advantage of the invention is the ability to prepare fine, ultrafine and nano-powders in large scale production.

It is an object of the invention to produce these specialized powders that outperform presently available powders.

It is an object of the invention to utilize low cost starting raw materials and to incorporate any purification within the process steps as required.

These and other advantages, as will be realized, are provided in a method of forming a powder $M_jX_p$ wherein $M_j$ is a positive ion or several positive ions selected from alkali metal, alkaline earth metal or transition metal; and $X_p$ is a monoatomic or a polyatomic anion selected from Groups IIIA, IVA, VA, VIA or VIIA; called complexometric precursor formulation or CPF. The method includes the steps of:
providing a first reactor vessel with a first gas diffuser and a first agitator;
providing a second reactor vessel with a second gas diffuser and a second agitator; charging the first reactor vessel with a first solution comprising a first salt of $M_jX_p$;
introducing gas into the first solution through the first gas diffuser,
charging the second reactor vessel with a second solution comprising a second salt of $M_jX_p$;
adding the second solution to the first solution to form a complexcelle;
drying the complexcelle, to obtain a dry powder; and
calcining the dried powder of said $M_jX_p$.

Yet another embodiment is provided in a compound $M_jX_p$ prepared by the complexometric precursor formulation methodology wherein:
$M_j$ is at least one positive ion selected from the group consisting of alkali metals, alkaline earth metals and transition metals and n is an integer representing the moles of said positive ion per moles of said $M_jX_p$; and
$X_p$, a negative anion or polyanion from Groups IIIA, IV A, VA, VIA and VIIA and may be one or more anion or polyanion and p is an integer representing the moles of said negative ion per moles of said $M_jX_p$.

FIGURES

FIG. 5A schematically illustrates agitator blades with wound concentric rings.

FIG. 5B is a side schematic partial view of the concentric rings of the agitator blade.

FIG. 5C schematically illustrates one set of propellers with three blades, concentric rings are not shown, attached to the mixer shaft, each blade rotating on its own axis horizontally and vertically on the mixer axis.

FIG. 5D schematically illustrates two sets of propellers with three blades arranged on the mixer shaft.

FIG. 5E schematically illustrates one set of propellers with three blades arranges alternately on the mixer shaft.

FIG. 5F schematically illustrates one set of propellers with four blades on the mixer shaft.

FIG. 5G schematically illustrates one set of propellers with four blades arranged alternately on the shaft of the reactor.

Figure 6A:
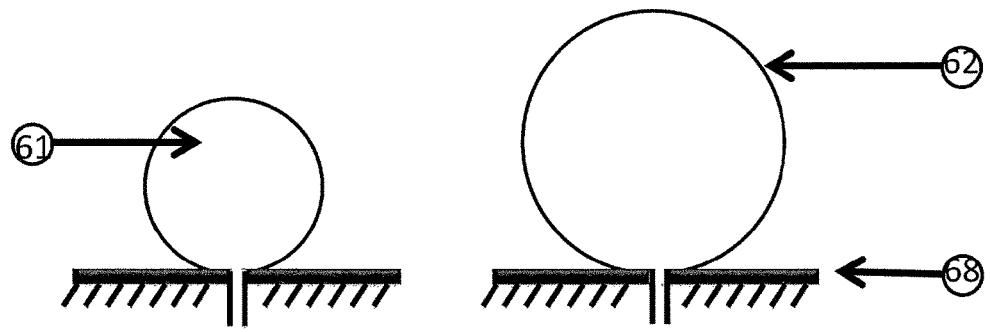

FIG. 6A schematically illustrates a bubble surface above the bulk of the solution showing small and large bubbles.

Figure 6B:
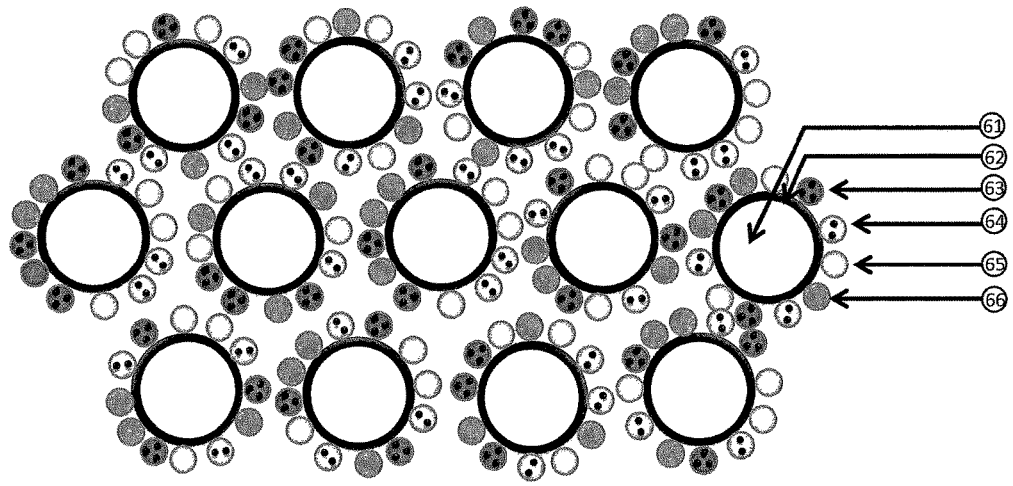

FIG. 6B is a top schematic view of the bubble surface interface showing the reactants on the surface interface.

FIG. 7 is a schematic representation of the steps during complexcelle formation and separation from the bulk of the solution.

Figure 8A:
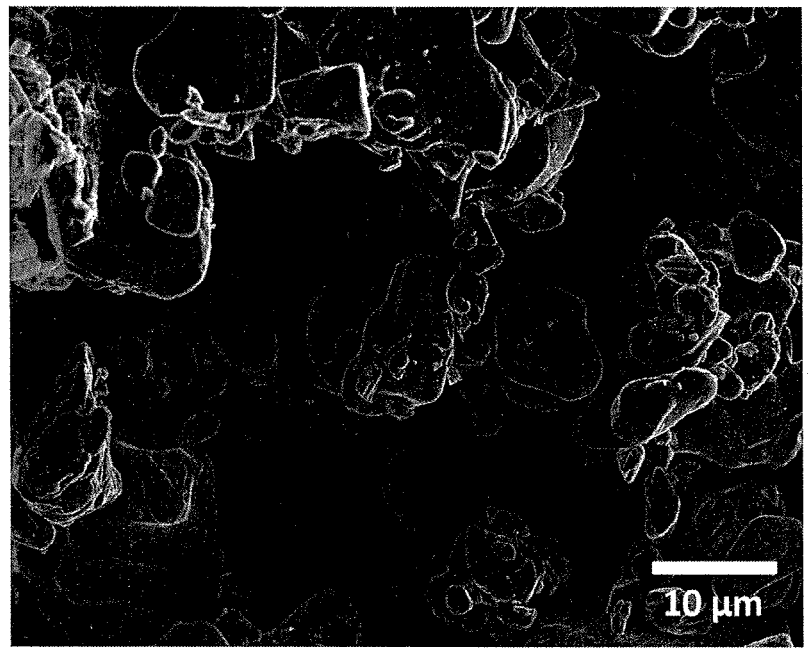

FIG. 8A is a scanning electron micrograph at 5000× of a commercial $LiCoO_2$ in Example 1.

Figure 8B:
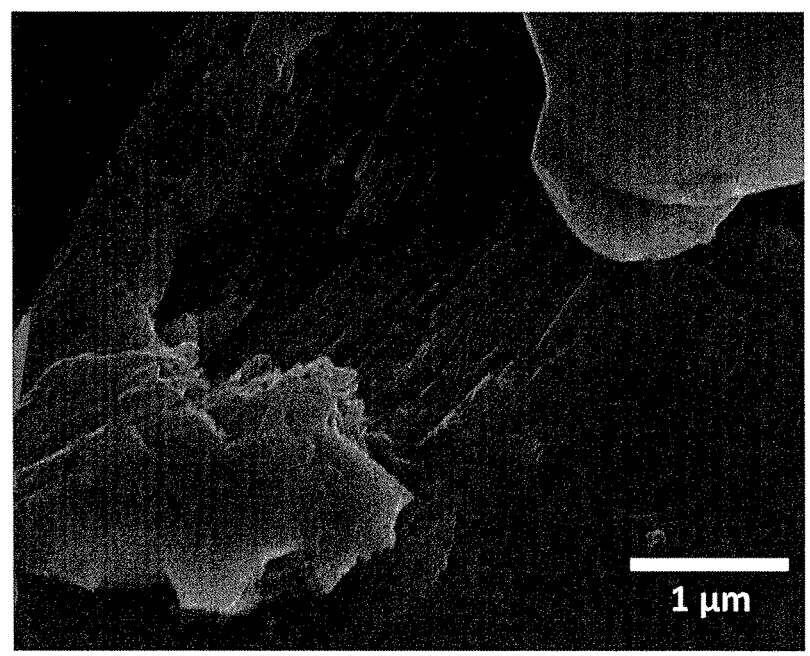

FIG. 8B is a scanning electron micrograph at 25000× of a commercial $LiCoO_2$ in Example 1.

Figure 9:
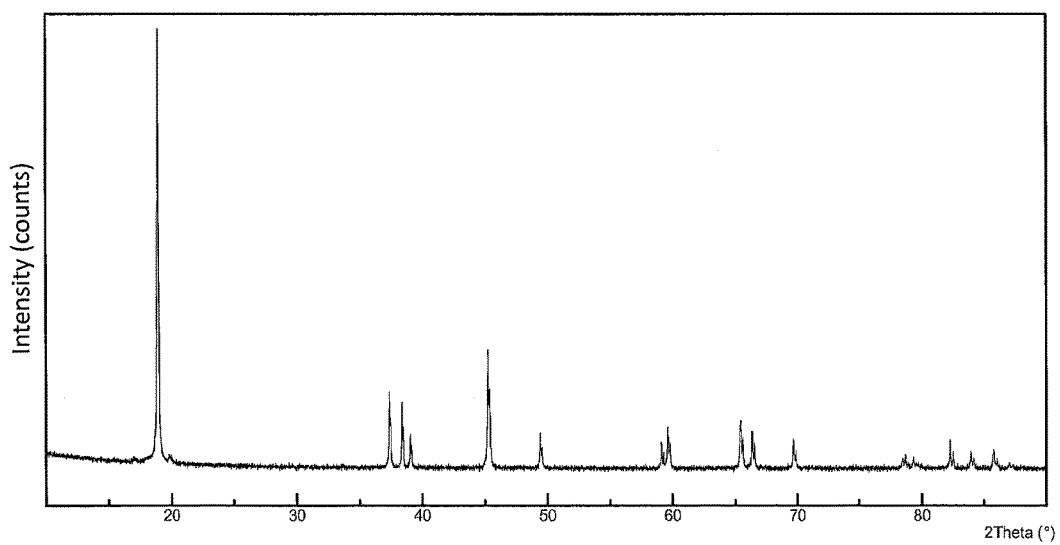

FIG. 9 is an x-ray powder diffraction pattern of a commercial $LiCoO_2$ in Example 1.

Figure 10:
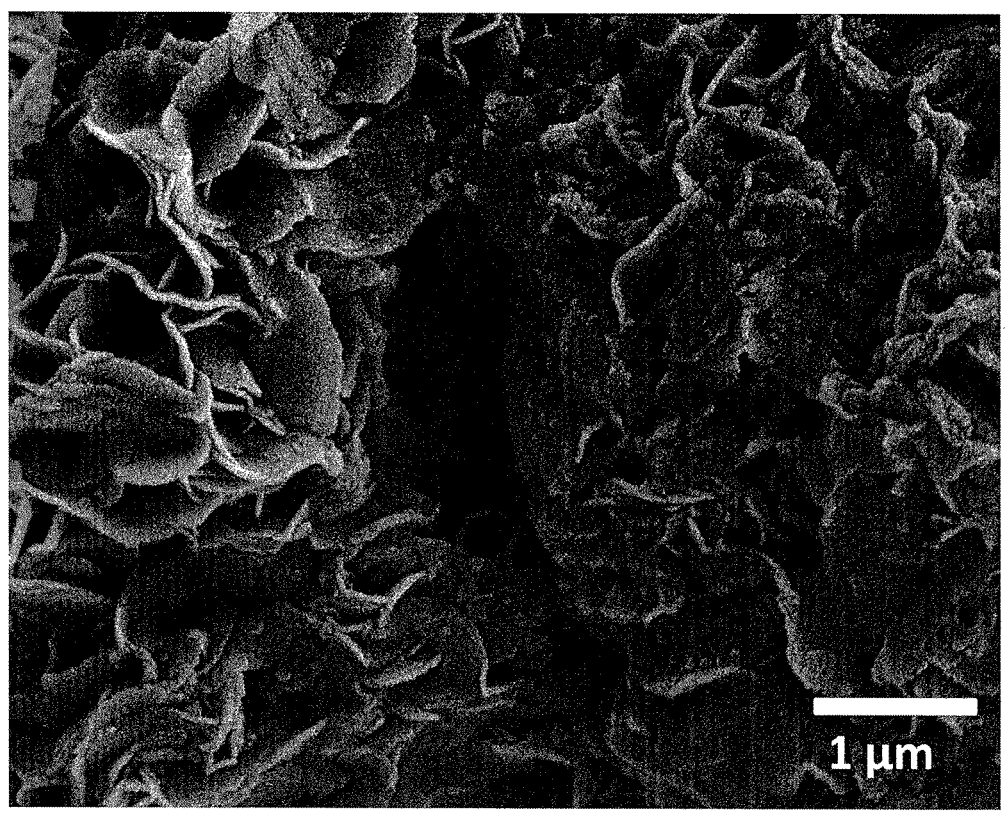

FIG. 10 is a scanning electron micrograph at 5000× of air dried $LiCoO_2$ feed precursor to the spray dryer for Example 2.

Figure 11A:
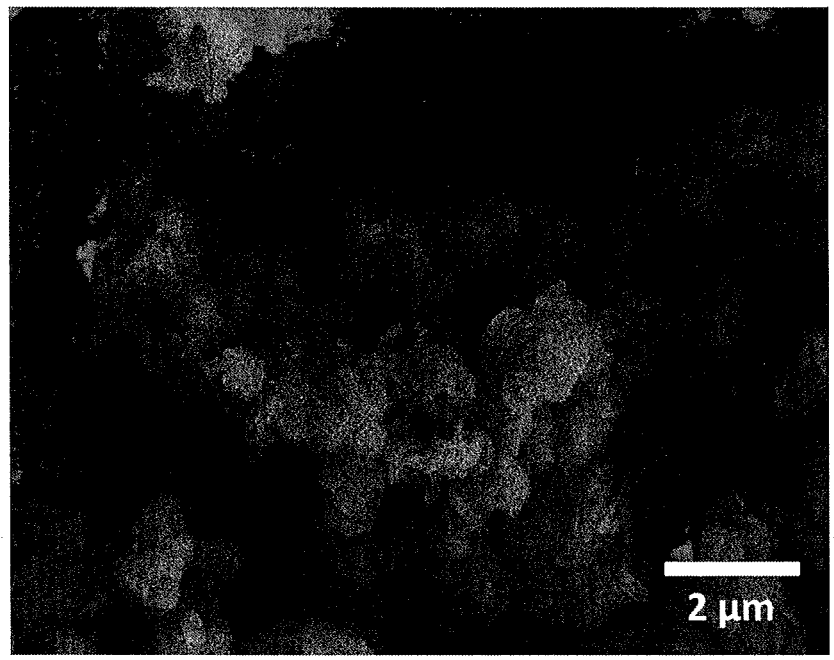

FIG. 11A is a scanning electron micrograph at 10000× of spray dried $LiCoO_2$ described in Example 2 prior to calcination.

Figure 11B:
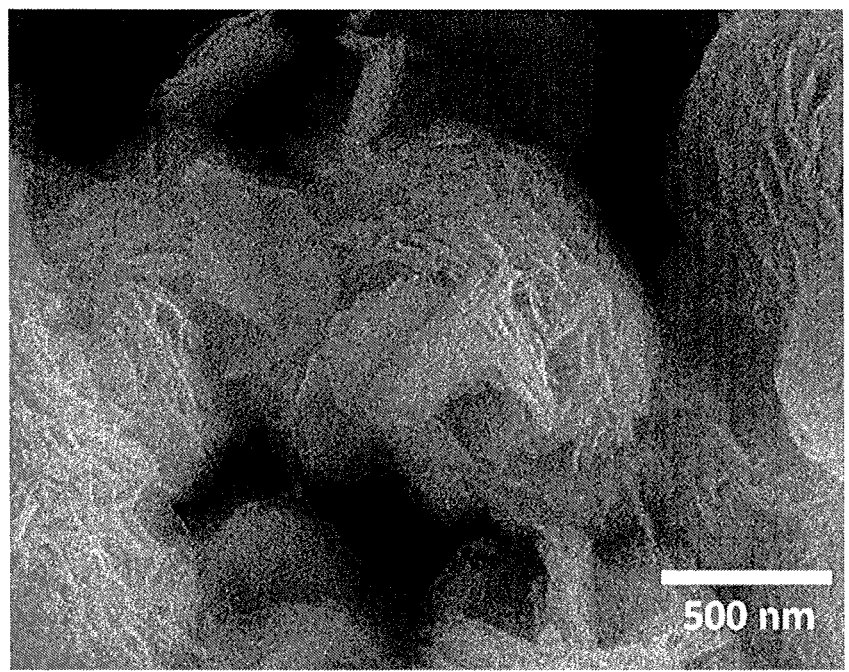

FIG. 11B is a scanning electron micrograph at 25000× of spray dried LiCoO2 described in Example 2 prior to calcination.

Figure 12:
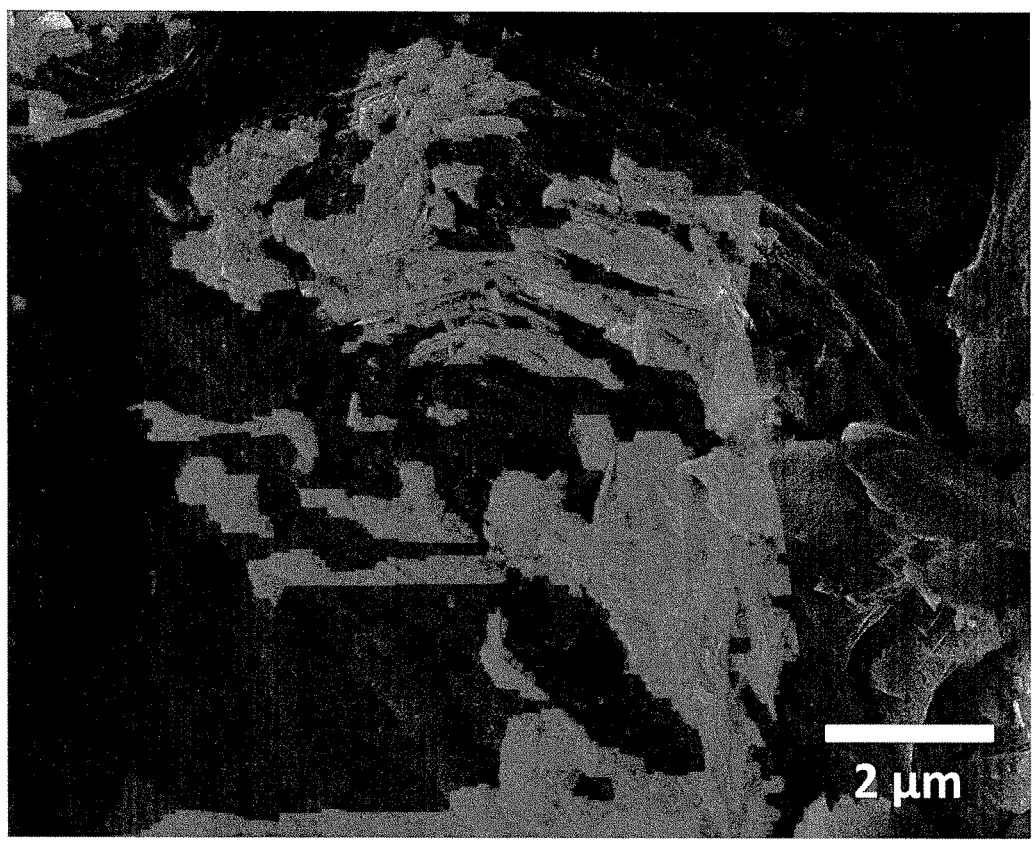

FIG. 12 is a scanning electron micrograph at 10000× of spray dried $LiCoO_2$ described in Example 2 after calcination.

Figure 13:
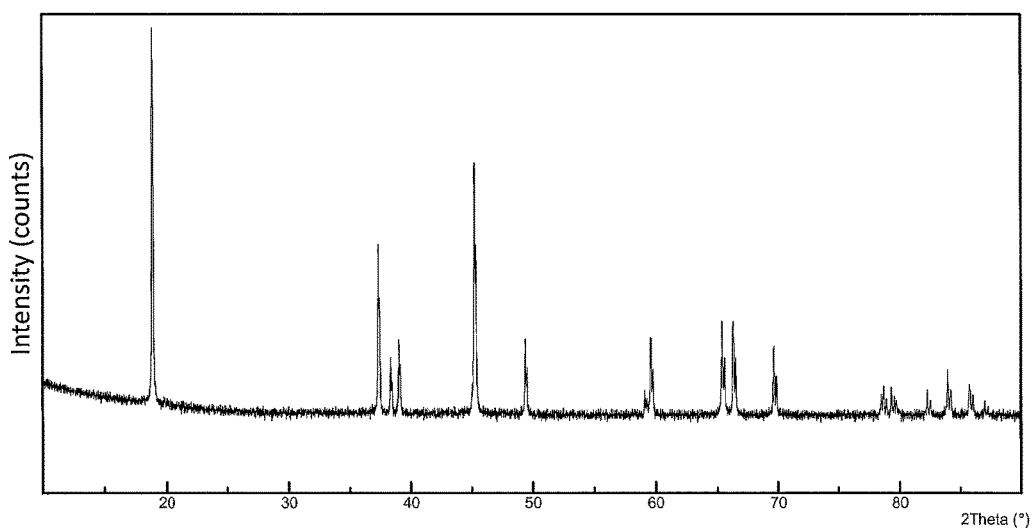

FIG. 13 is an x-ray powder diffraction pattern of $LiCoO_2$ in Example 1.

Figure 14:
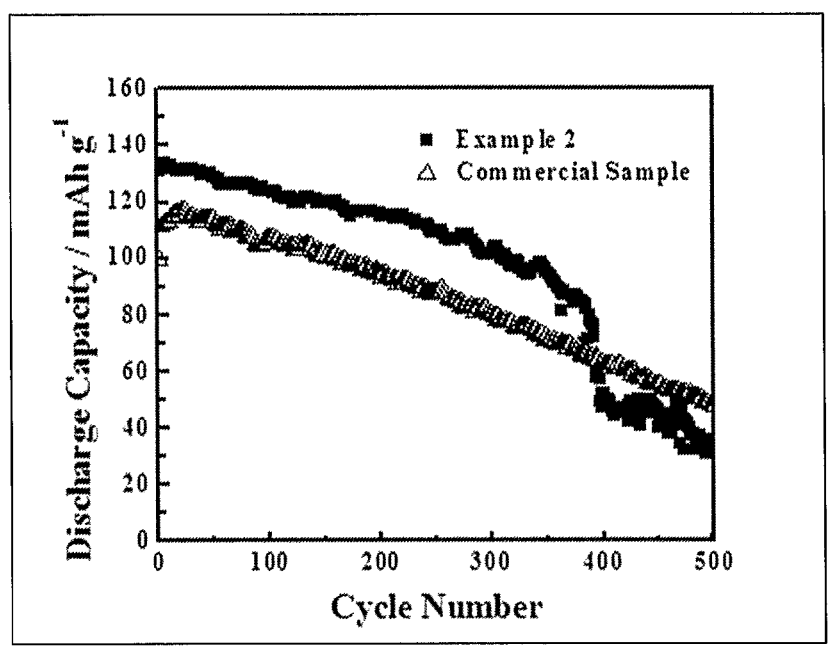

FIG. 14 is battery cycling data for Examples 1 and 2 at C/20 for 500 cycles.

Figure 15:
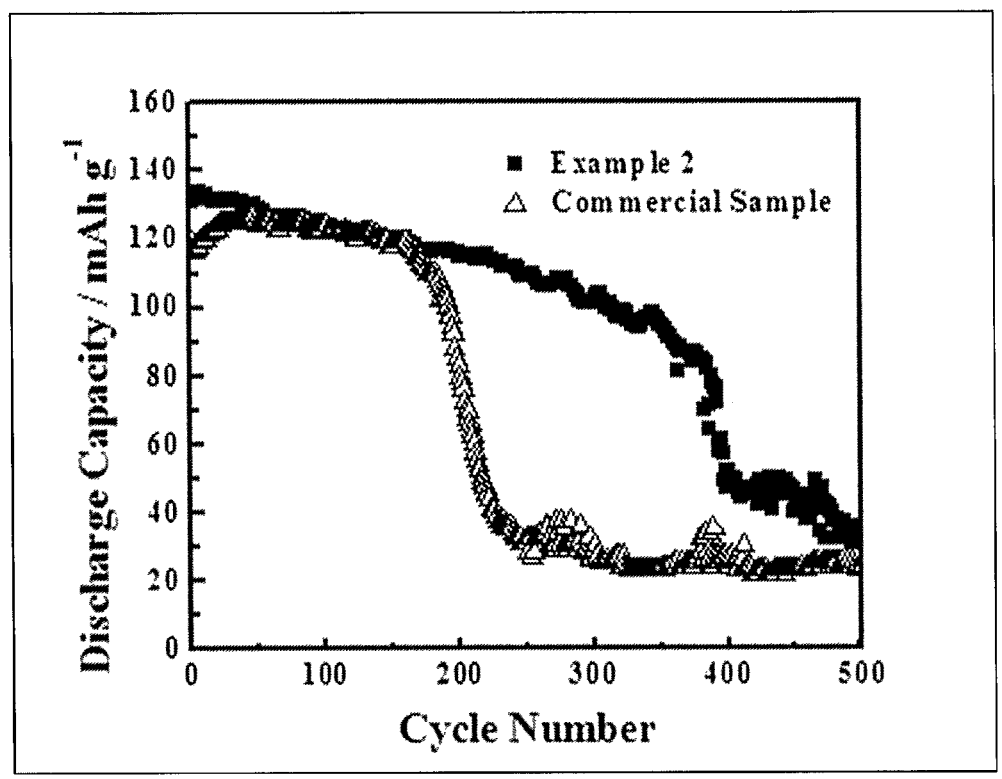

FIG. 15 is battery cycling data at 1 C for 500 cycles for Examples 1 and 2 after recalcination for 5 h at 900° C.

Figure 16:
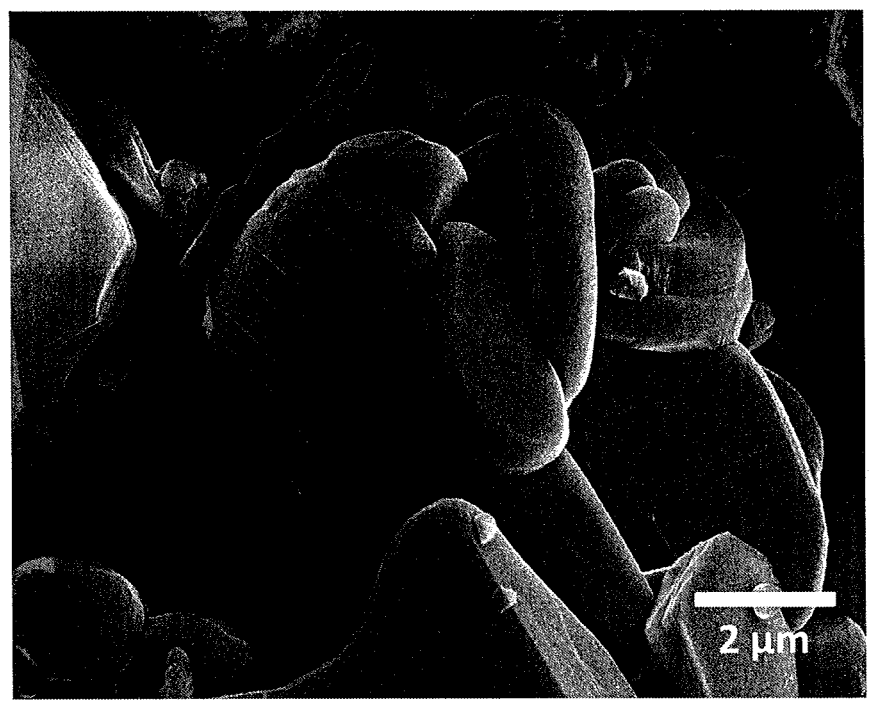

FIG. 16 is a scanning electron micrograph at 10000× of recalcined $LiCoO_2$ from Example 2.

Figure 17:
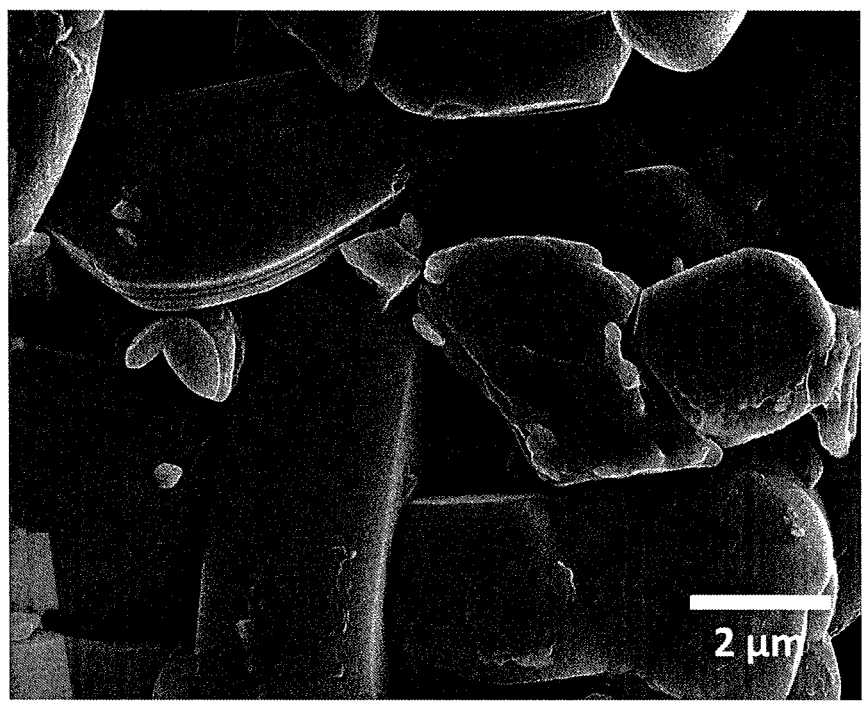

FIG. 17 is a scanning electron micrograph at 10000× of recalcined commercial $LiCoO_2$ from Example 1.

Figure 18A:
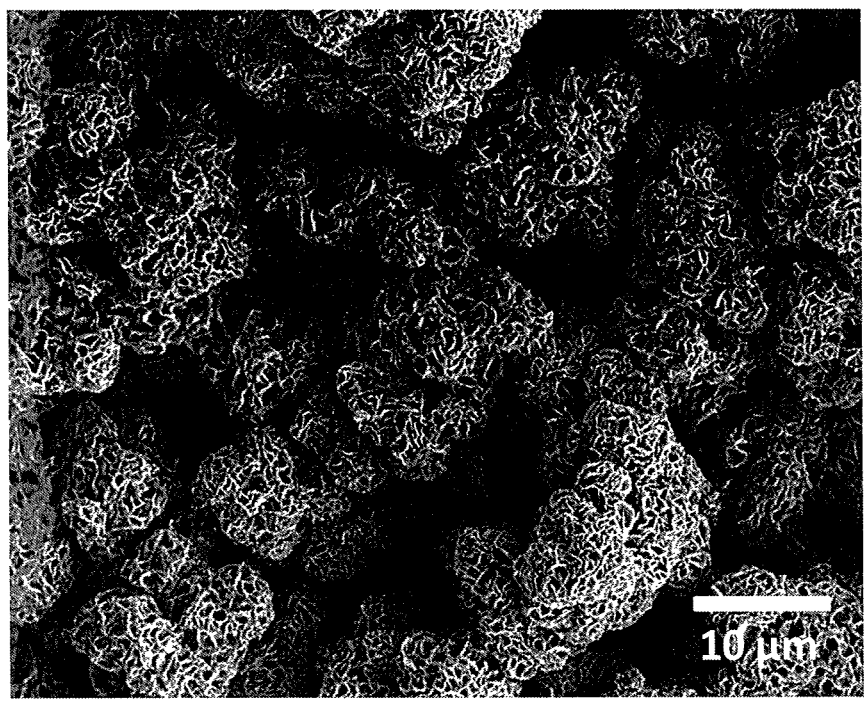

FIG. 18A is a scanning electron micrograph at 2000× of air-dried $Li_{1.20}Ni_{0.18}Mn_{0.50}Co_{0.12}O_2$ from Example 4.

Figure 18B:
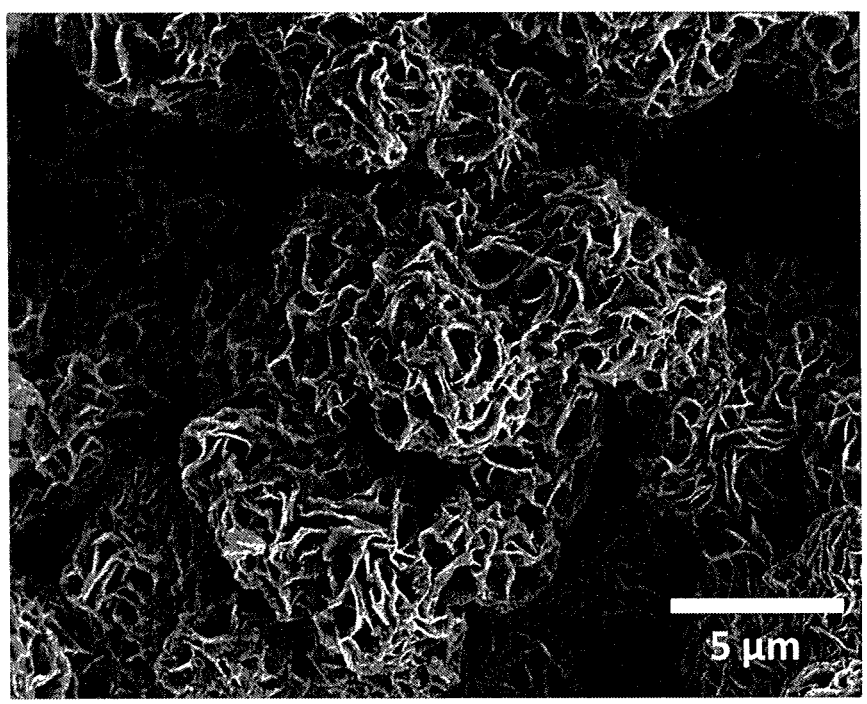

FIG. 18B is a scanning electron micrograph at 10000× of air-dried $Li_{1.20}Ni_{0.18}Mn_{0.50}Co_{0.12}O_2$ from Example 4.

Figure 19A:
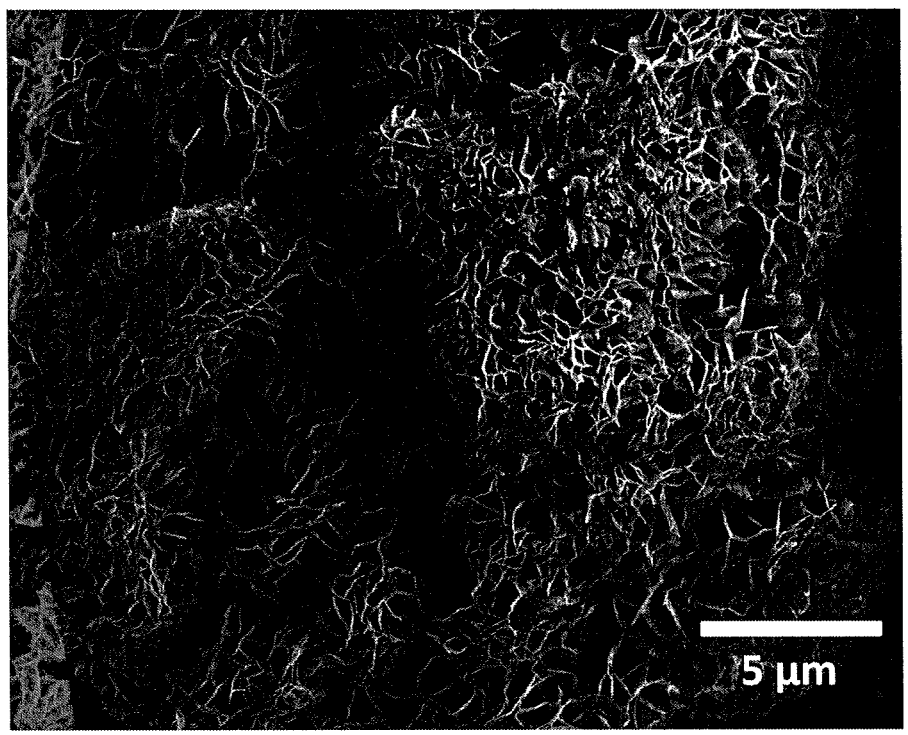

FIG. 19A is a scanning electron micrograph at 5000× of spray dried $Li_{1.20}Ni_{0.18}Mn_{0.50}Co_{0.12}O_2$ from Example 4.

Figure 19B:
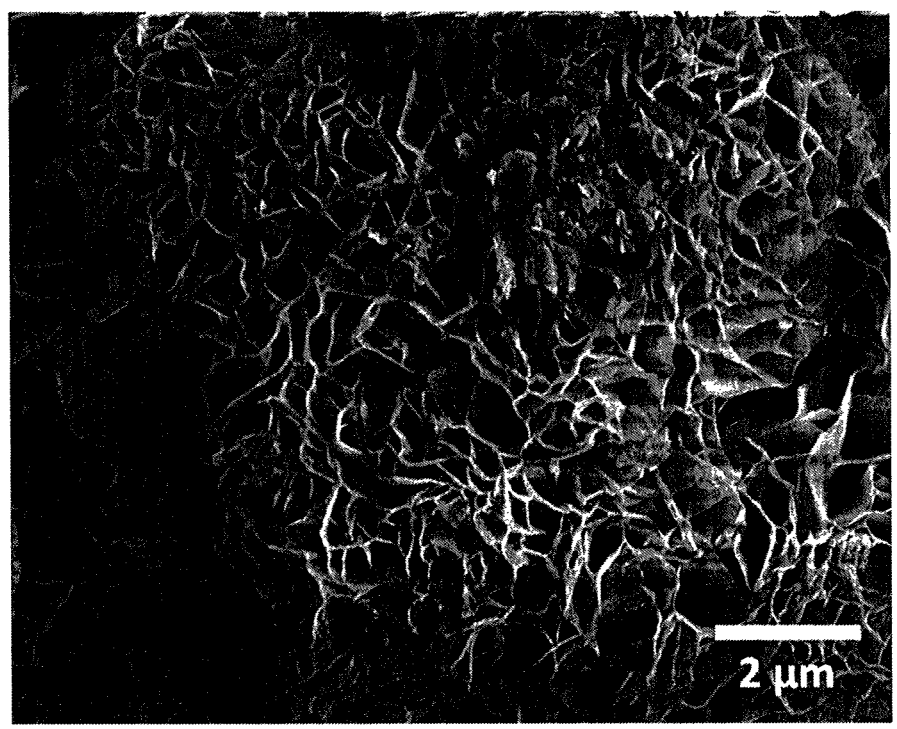

FIG. 19B is a scanning electron micrograph at 10000× of spray dried $Li_{1.20}Ni_{0.18}Mn_{0.50}Co_{0.12}O_2$ from Example 4.

Figure 20A:
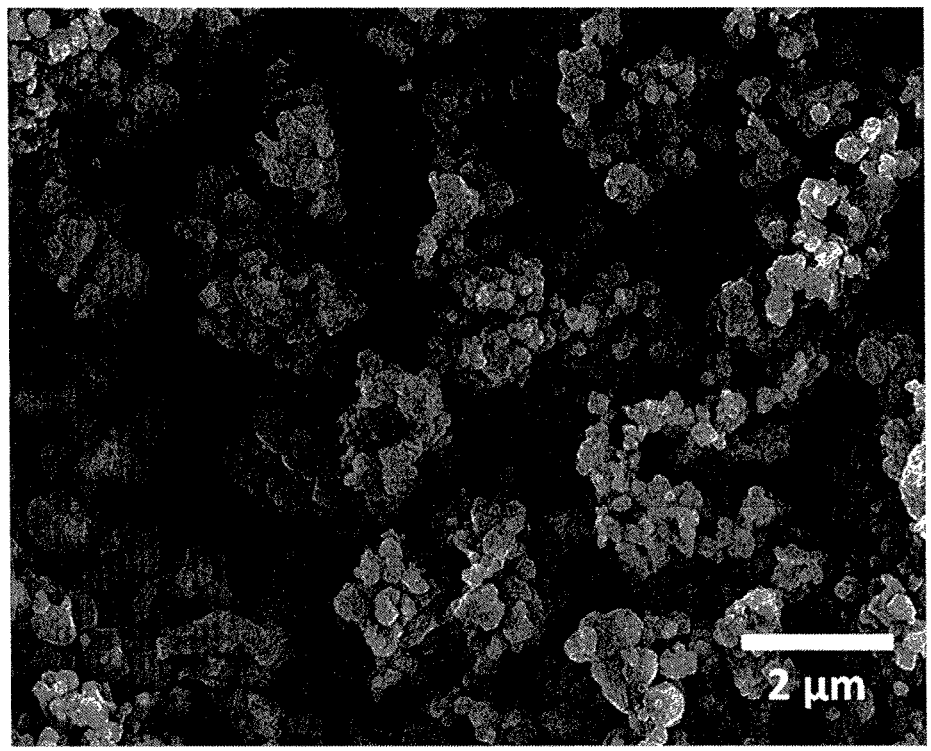

FIG. 20A is a scanning electron micrograph at 10000× of calcined $Li_{1.20}Ni_{0.18}Mn_{0.50}Co_{0.12}O_2$ from Example 4.

Figure 20B:
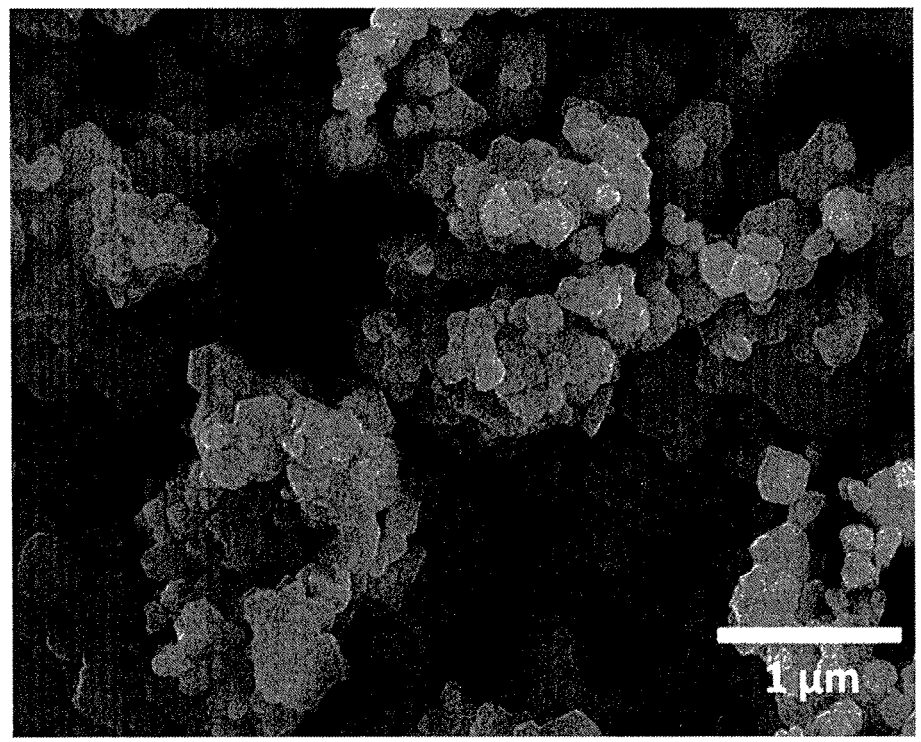

FIG. 20B is a scanning electron micrograph at 25000× of calcined $Li_{1.20}Ni_{0.18}Mn_{0.50}Co_{0.12}O_2$ from Example 4.

Figure 21:
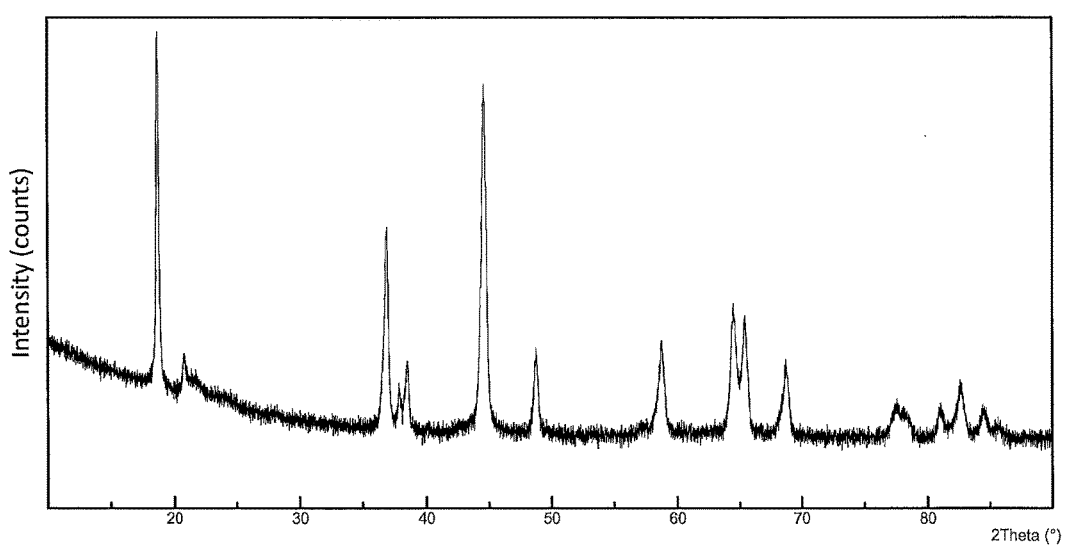

FIG. 21 is an x-ray powder diffraction pattern of calcined $Li_{1.20}Ni_{0.18}Mn_{0.50}Co_{0.12}O_2$ from Example 4.

Figure 22:
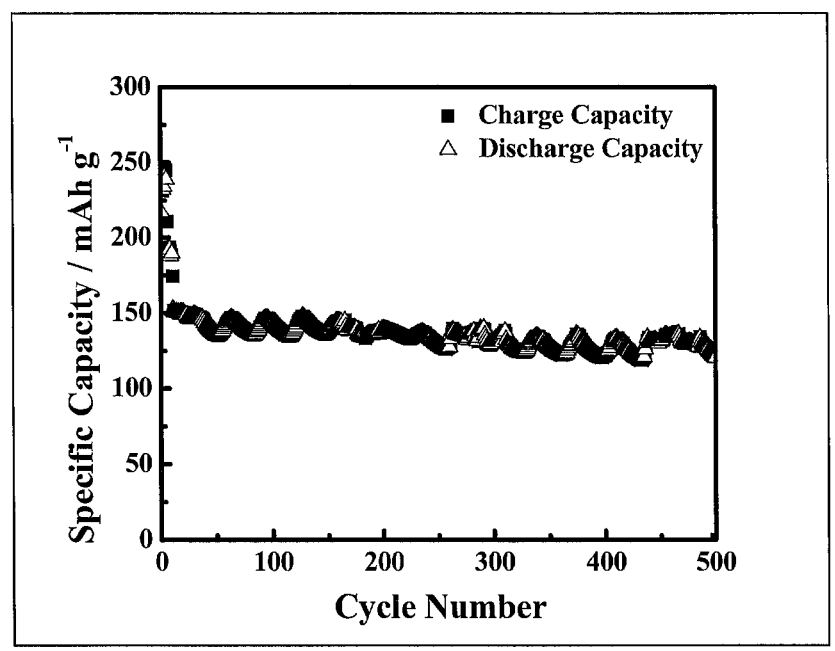

FIG. 22 is battery Cycling Data for calcined $Li_{1.20}Ni_{0.18}Mn_{0.50}Co_{0.12}O_2$ from Example 4 at RT for 500 cycles at 1 C.

Figure 23A:
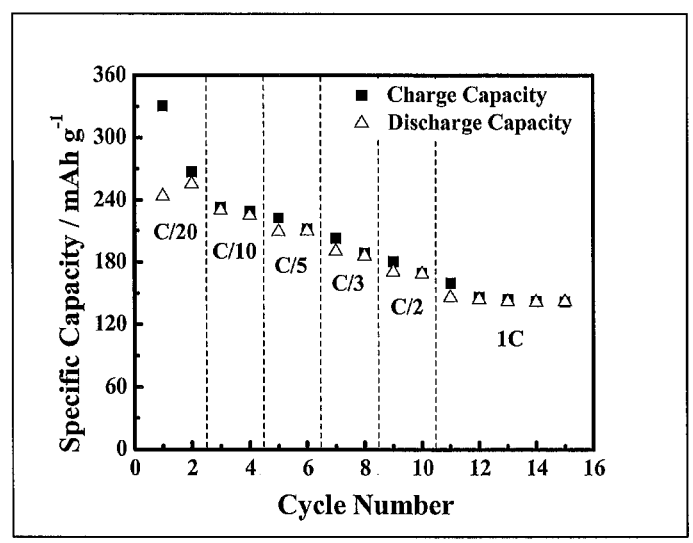

FIG. 23A is battery Cycling Data for calcined $Li_{1.20}Ni_{0.18}Mn_{0.50}Co_{0.12}O_2$ from Example 4 at 30° C. for 500 cycles at different C rates from C/20 to 1 C.

Figure 23B:
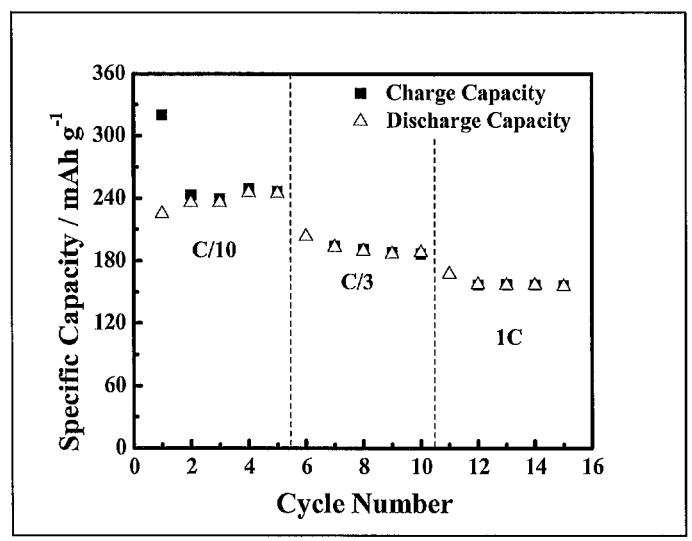

FIG. 23B is battery Cycling Data for calcined $Li_{1.20}Ni_{0.18}Mn_{0.50}Co_{0.12}O_2$ from Example 4 at 30° C. for 500 cycles at different C rates from C/10, C/3 and 1 C.

Figure 24A:
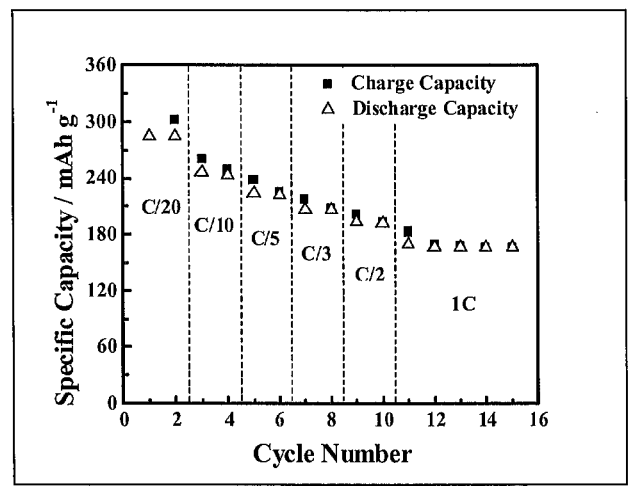

FIG. 24A is battery Cycling Data for calcined $Li_{1.20}Ni_{0.18}Mn_{0.50}Co_{0.12}O_2$ from Example 4 at 25° C. for 500 cycles at from C/20 to 1 C.

Figure 24B:
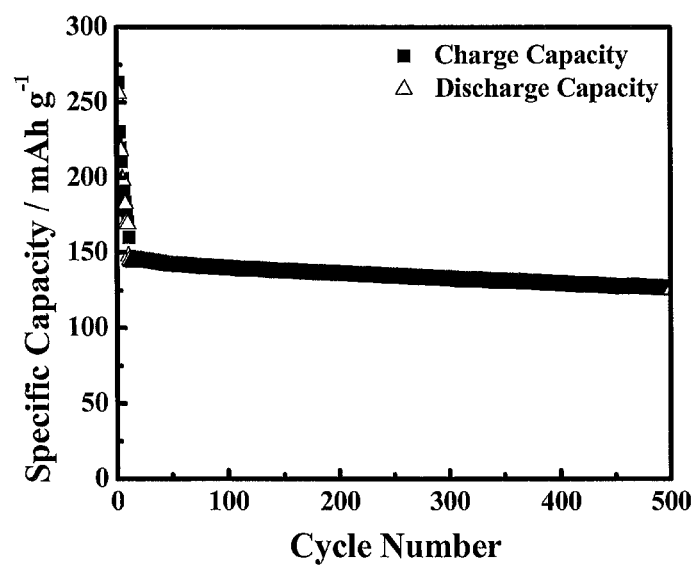

FIG. 24B is battery Cycling Data for calcined $Li_{1.20}Ni_{0.18}Mn_{0.50}Co_{0.12}O_2$ from Example 4 at 25° C. for 500 cycles at 1 C.

Figure 25A:
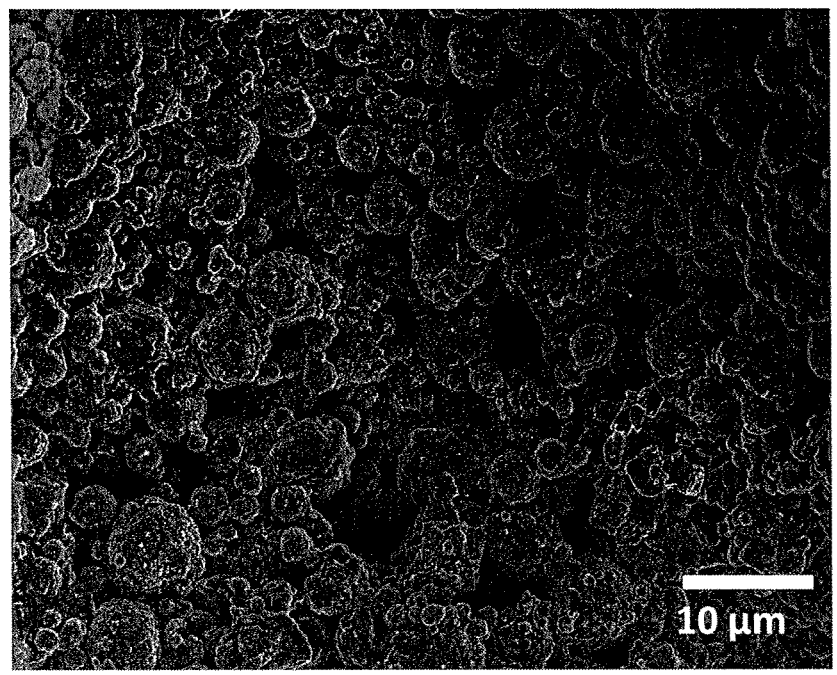

FIG. 25A is a scanning electron micrograph at 2000× of spray dried $LiCoO_2$ from Example 6.

Figure 25B:
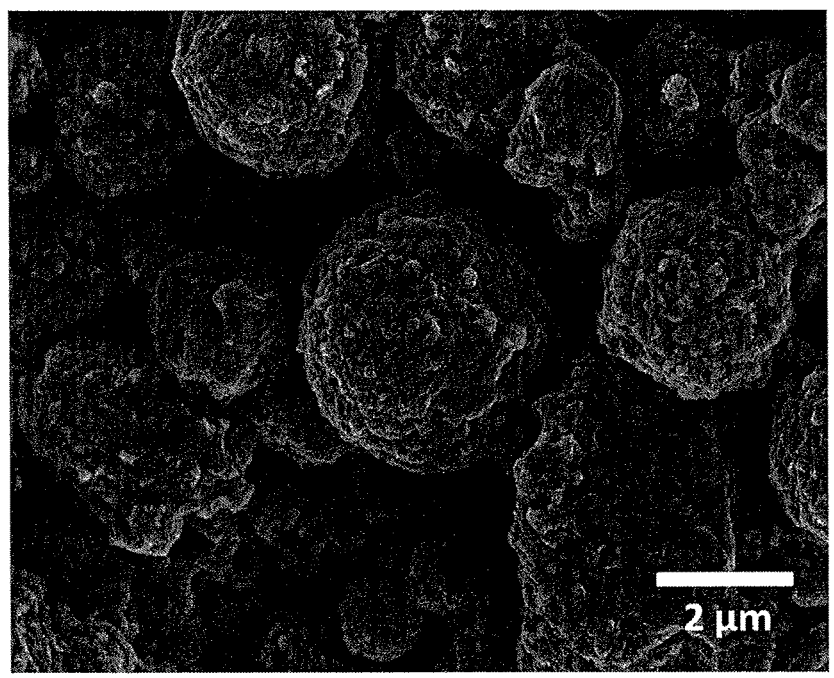

FIG. 25B is a scanning electron micrograph at 10000× of spray dried $LiCoO_2$ from Example 6.

Figure 26:
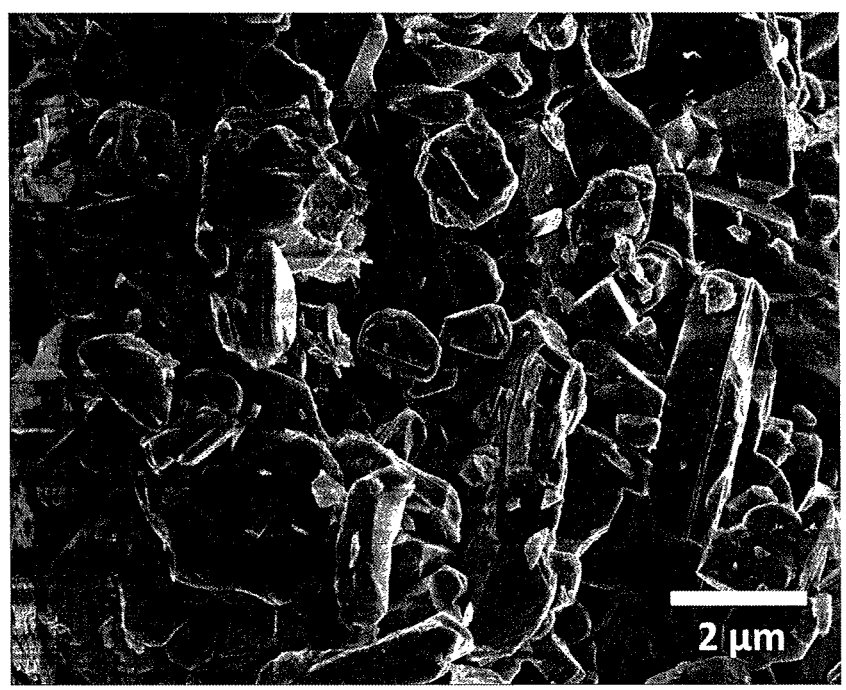

FIG. 26 is a scanning electron micrograph at 10000× of calcined $LiCoO_2$ from Example 6.

Figure 27:
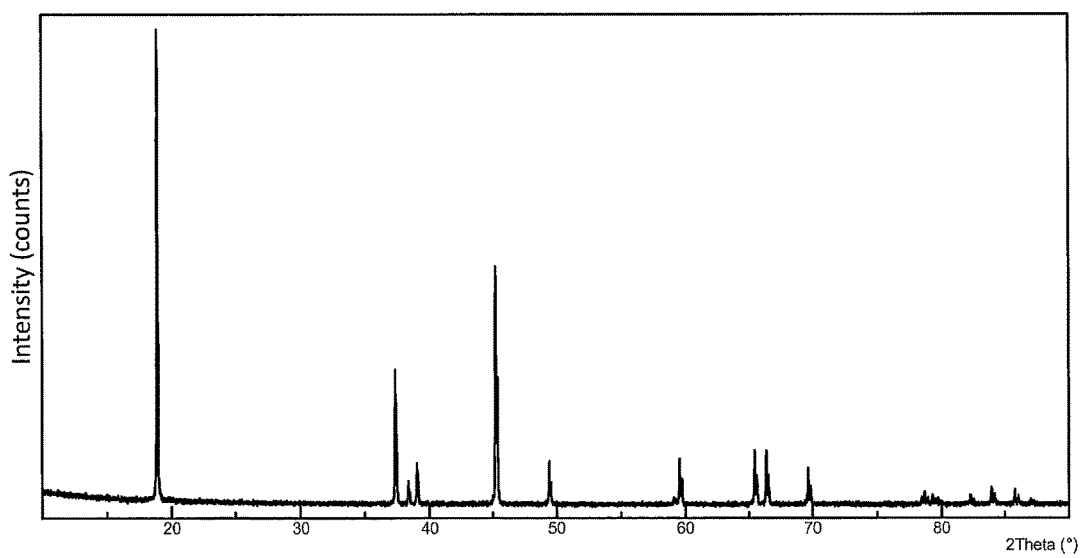

FIG. 27 is an X-ray powder diffraction pattern of $LiCoO_2$ in Example 6.

Figure 28:
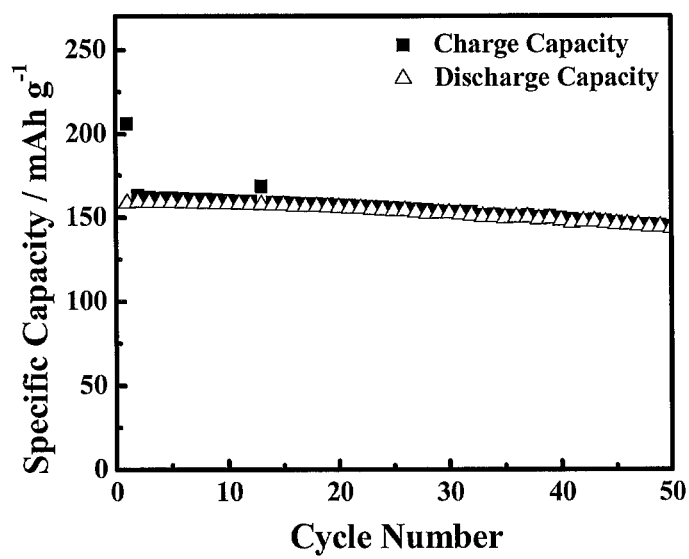

FIG. 28 is the battery cycling data for $LiCoO_2$ of Example 6 at C/20 for 50 cycles.

Figure 29:
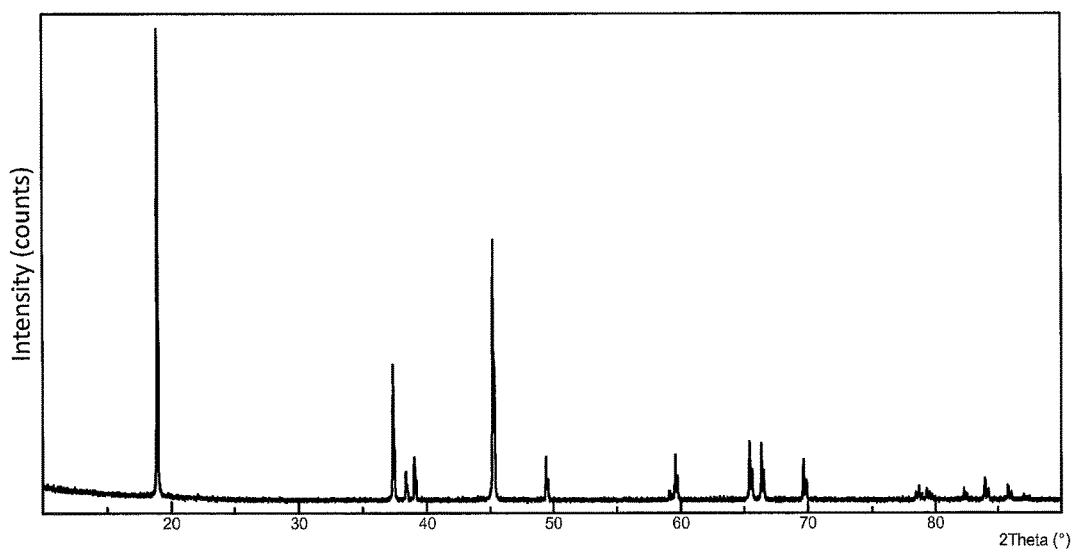

FIG. 29 is an X-ray powder diffraction pattern of $LiCoO_2$ after calcination for 5 h at 900° C. in Example 7.

Figure 30A:
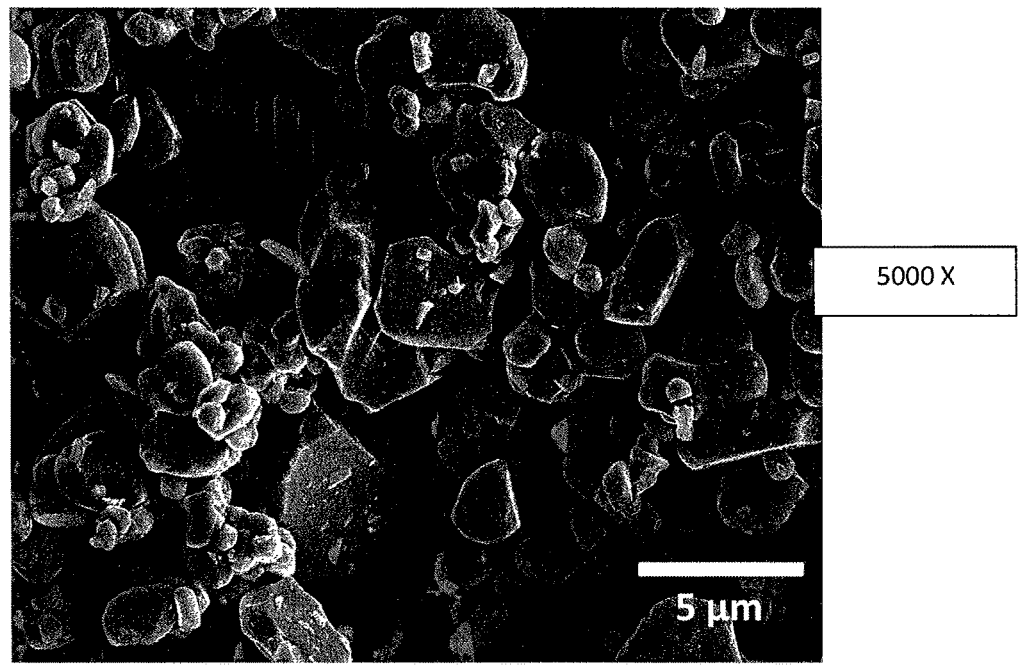

FIG. 30A is a scanning electron micrograph at 5000× of calcined $LiCoO_2$ from Example 7.

Figure 30B:
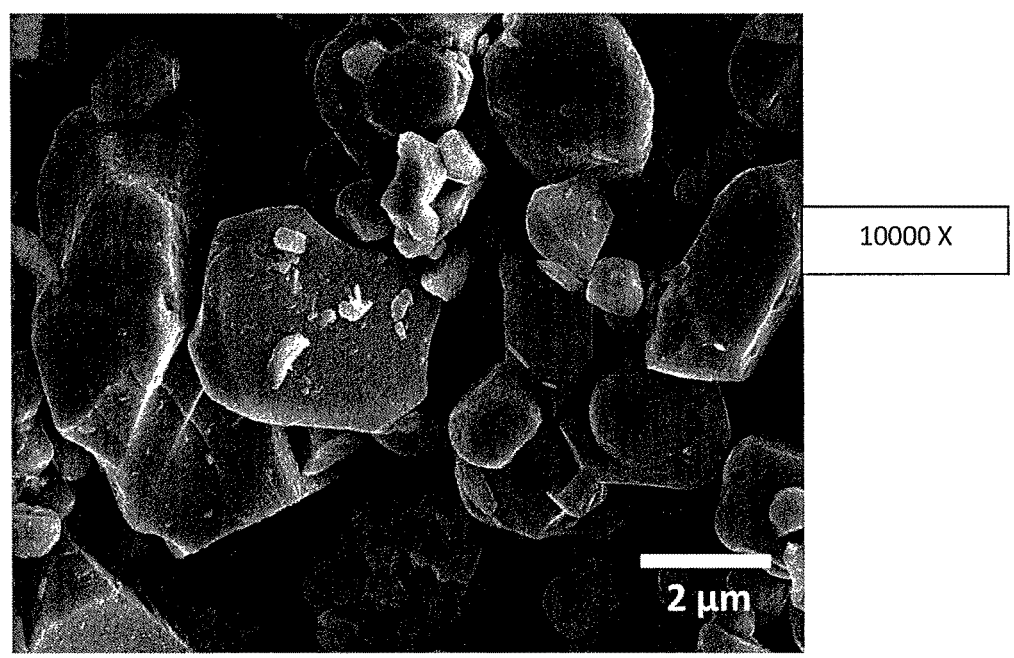

FIG. 30B is a scanning electron micrograph at 10000× of calcined $LiCoO_2$ from Example 7.

Figure 30C:
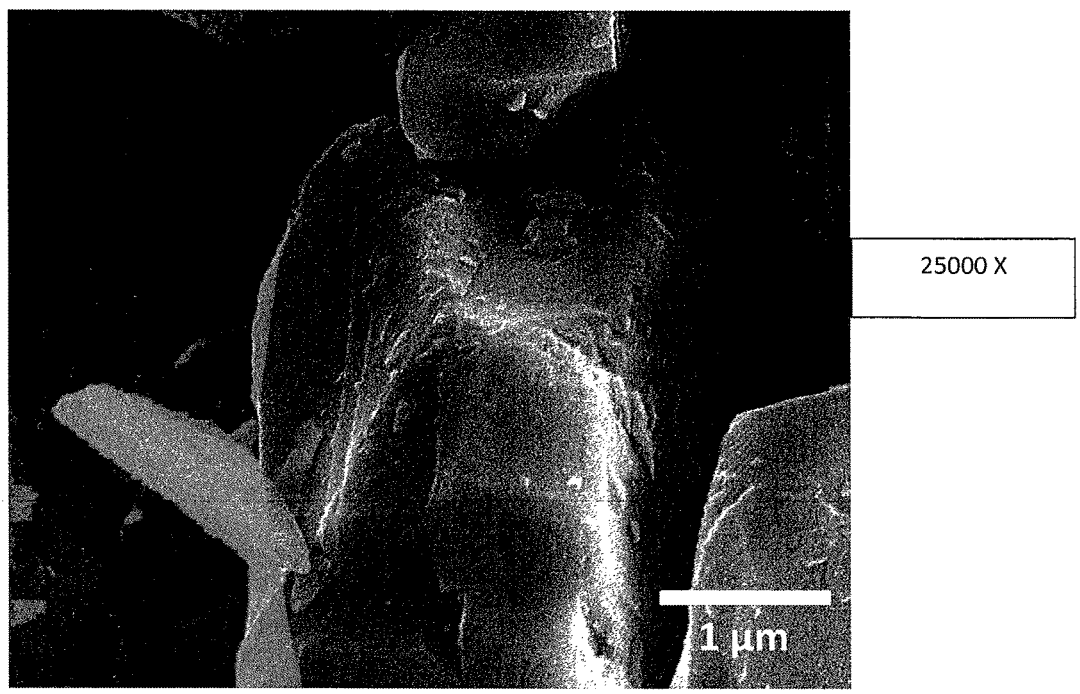

FIG. 30C is a scanning electron micrograph at 25000× of calcined $LiCoO_2$ from Example 7.

Figure 31:
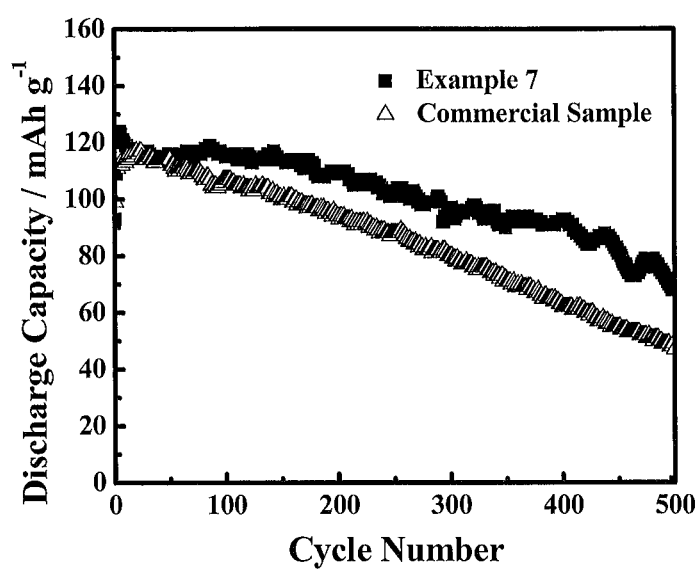

FIG. 31 is the battery cycling data for $LiCoO_2$ of Example 7 and the commercial sample at 1 C for 50 cycles at RT.

Figure 32:
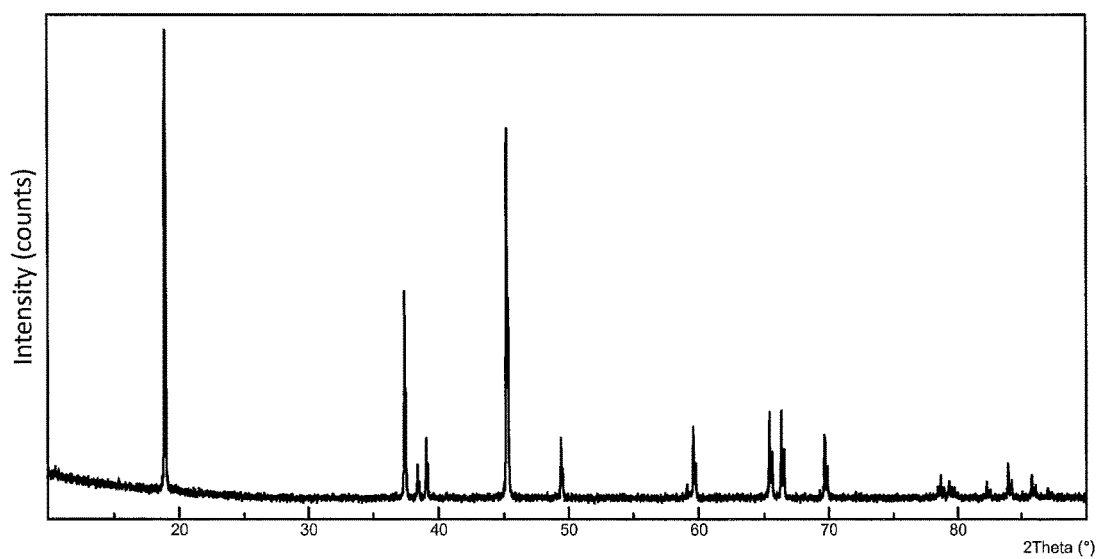

FIG. 32 is an X-ray powder diffraction pattern of $LiCoO_2$ fired two times for 5 h at 900° C. in Example 8.

Figure 33A:
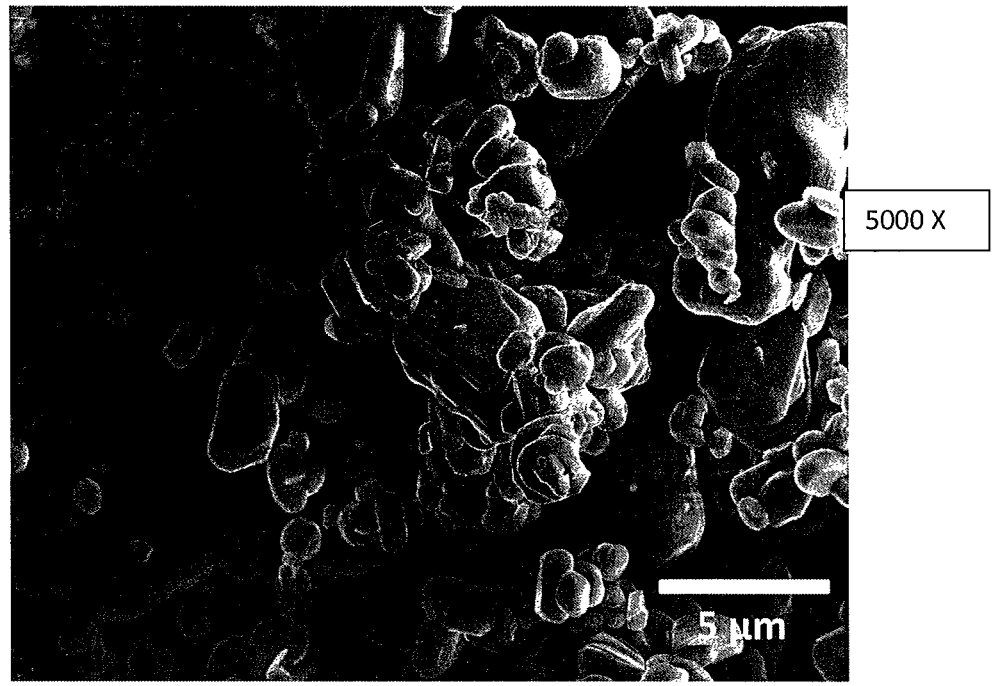

FIG. 33A is a scanning electron micrograph at 5000× of recalcined $LiCoO_2$ from Example 8.

Figure 33B:
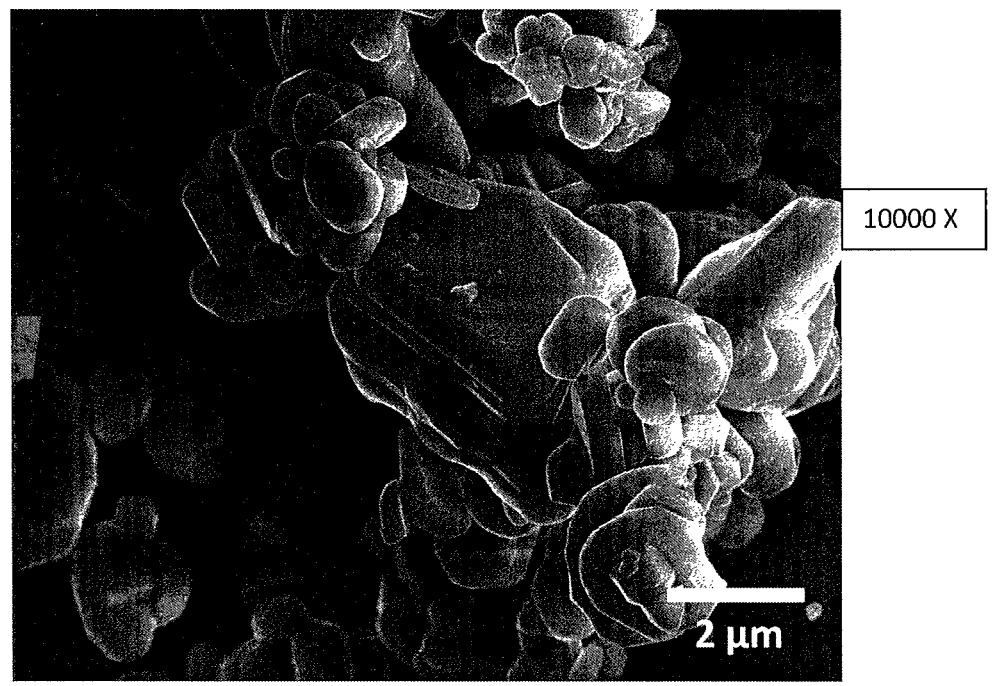

FIG. 33B is a scanning electron micrograph at 10000× of recalcined $LiCoO_2$ from Example 8.

Figure 33C:
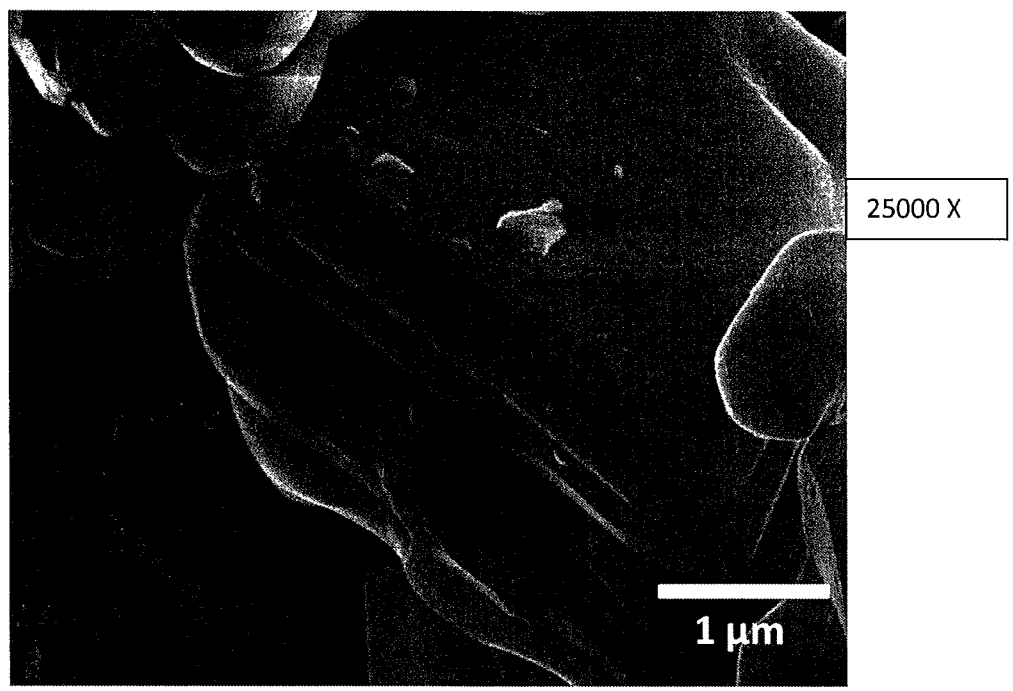

FIG. 33C is a scanning electron micrograph at 25000× of recalcined $LiCoO_2$ from Example 8.

Figure 34:
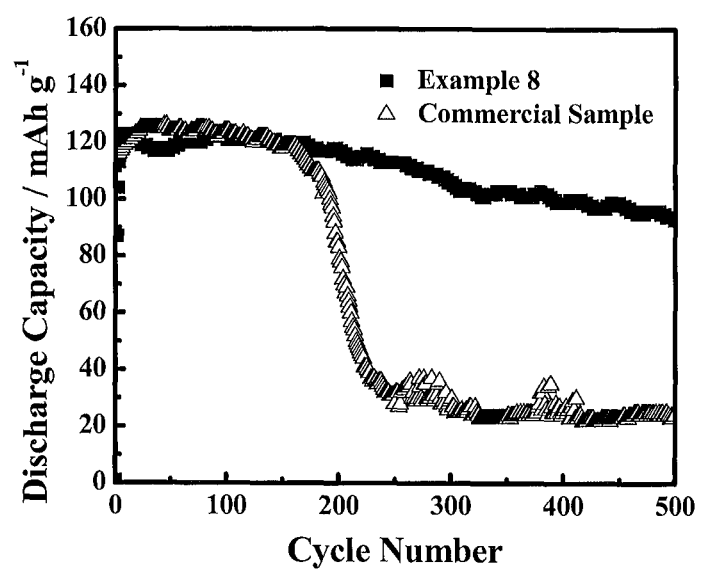

FIG. 34 is the battery cycling data for $LiCoO_2$ of Example 8 and the refired commercial sample in Example 3 at 1 C for 500 cycles at RT.

DESCRIPTION

The instant invention is specific to an improved method of forming nanoparticles. More specifically, the instant invention is specific to a method of forming particles through formation of a complexometric precursor formed on a bubble surface thereby allowing for careful control of nucleation and crystal growth.

The invention will be described with reference to the various figures which form an integral non-limiting component of the disclosure. Throughout the disclosure similar elements will be numbered accordingly.

This invention described herein is a complexometric precursor formulation methodology, hereinafter referred to as "CPF", suitable for large scale industrial production of high performance fine, ultrafine and nanosize powders requiring defined unique chemical and physical properties that are essential to meet performance specifications for specialized applications.

A particularly suitable material formed by the CPF process is a lithium nickel manganese cobalt compound defined by formula is $Li_{2-x-y-z}Ni_xMn_yCo_zO_2$ wherein $x+y+z \leq 1$ and at least one of x, y or z is not zero and more preferably none of x, y or z is zero.

Figure 1:
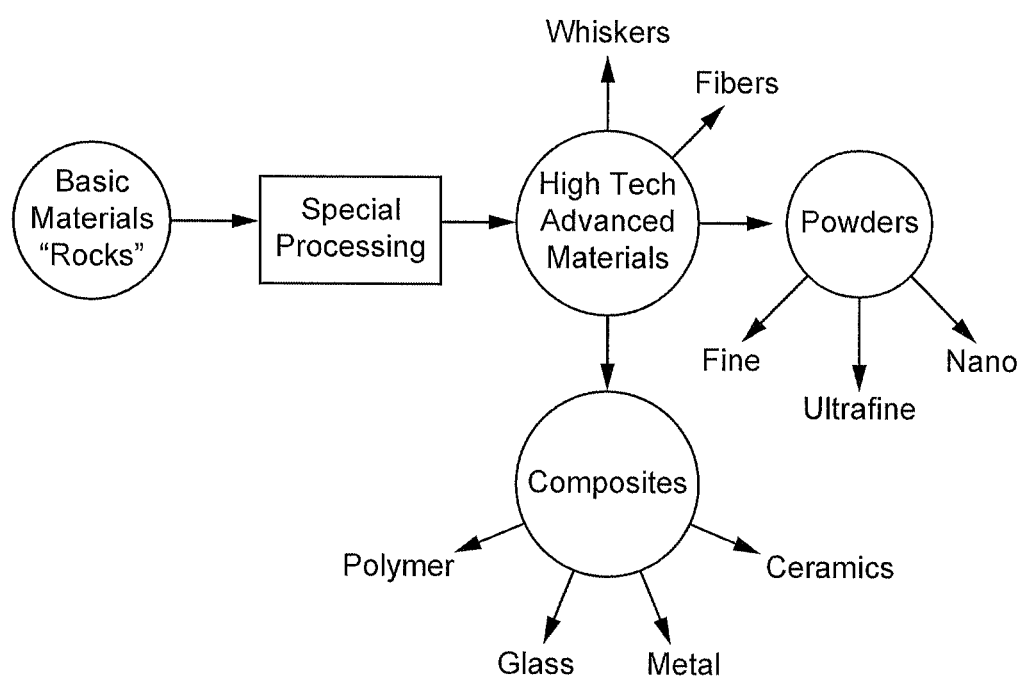
FIG. 1 is a diagram of advanced technical materials which require specialized processing to obtain composites, whiskers, fibers and powders.
Figure 2:
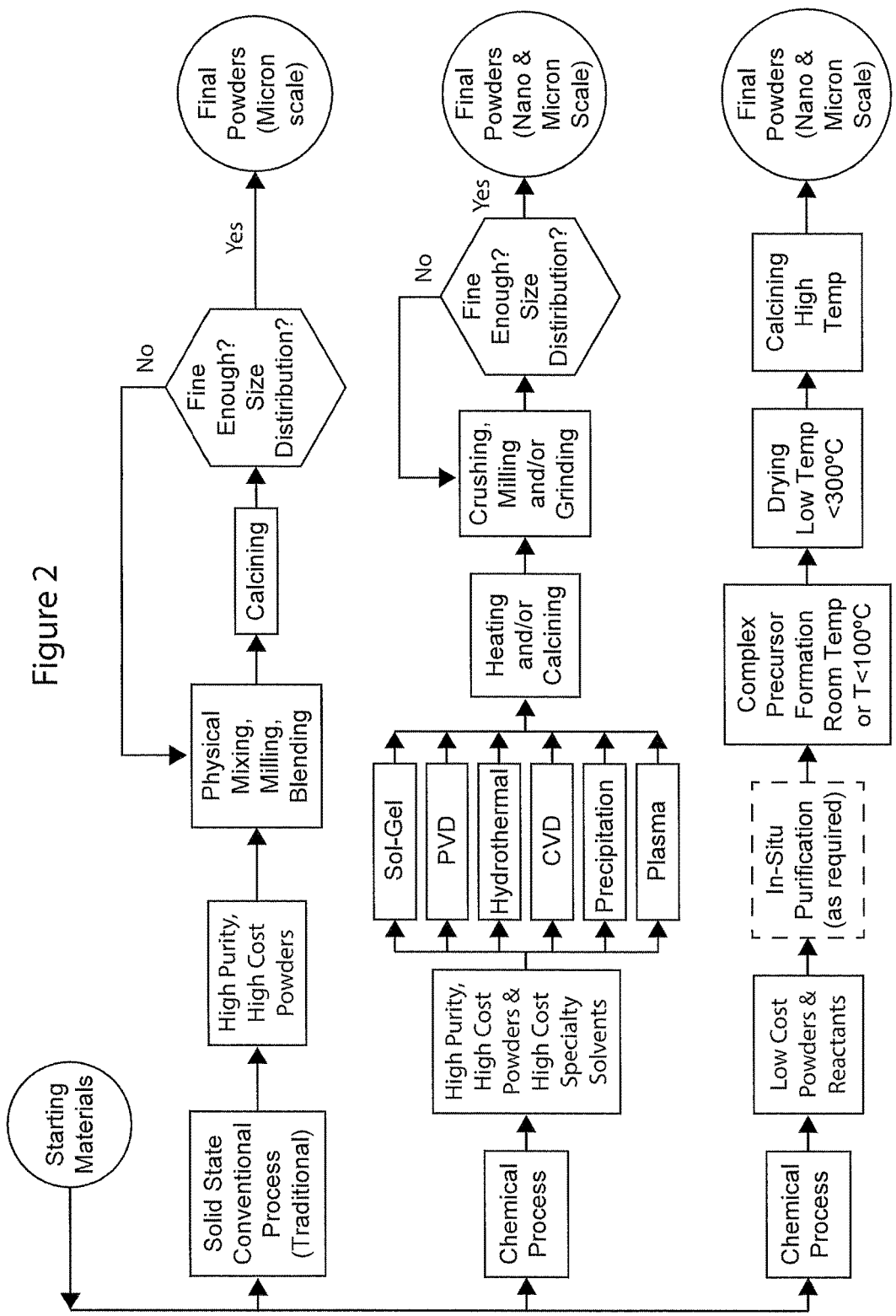
FIG. 2 is a comparison of preparative methods for powders.

The CPF method proceeds in the formation of a complex precursor, herein called complexcelle, on a bubble surface thereby providing for the controlled formation of specialized microstructures or nanostructures and a final product with particle size of less then 1 micron, surface area, porosity, phase purity, chemical purity and other essential characteristics tailored to satisfy performance specifications. Powders produced by CPF are obtained with a reduced number of processing steps relative to currently used technology and can utilize presently available industrial equipment. CPF is simple to implement and preferred design configurations are further described and illustrated in FIGS. 4 and 5. CPF methodology is applicable to any inorganic powder and organometallic powders with electrophilic or nucleophilic ligands. The CPF procedure can use low cost raw materials as the starting raw materials and if needed, additional purification or separation can be done in-situ. Inert or oxidative atmospheric conditions required for powder synthesis are easily achieved with the equipment for this method. Temperatures for the reactions forming the complexcelle are ambient or slightly warm but preferably not more than 100° C. The CPF process can be a batch process or a continuous process wherein product is moved from one piece of equipment to the next in sequence. A comparison of traditional methods and other conventional processing is diagrammed in FIG. 2 with this CPF methodology. Representative examples are discussed and compared with commercially available samples showing both physical properties and performance improvements of powders synthesized using this CPF methodology.

The CPF method produces fine, ultrafine and nanosize powders in a simple efficient way by integrating chemical principles of crystallization, solubility, transition complex formation, phase chemistry, acidity and basicity, aqueous chemistry, thermodynamics and surface chemistry.

It is preferred to produce these powders with the selected properties at the onset of the contact among the elements as these are combined to make the desired compound. The time when crystallization begins and, in particular, when the nucleation step begins, is the most crucial stage of formation of nanosize powders. A particular advantage provided by CPF is the ability to prepare the nanosize particles at the onset of this nucleation step. The solute molecules from the starting reactants are dispersed in a given solvent and are in solution. At this instance, clusters begin to form on the nanometer scale on the bubble surface under the right conditions of temperature, supersaturation, and other conditions. These clusters constitute the nuclei wherein the atoms begin to arrange themselves in a defined and periodic manner which later defines the crystal microstructure. Crystal size and shape are macroscopic properties of the crystal resulting from the internal crystal structure.

After the nucleation begins, crystal growth also starts and both nucleation and crystal growth may occur simultaneously as long as supersaturation exists. The rate of nucleation and growth is determined by the existing supersaturation in the solution and either nucleation or growth occurs over the other depending on the supersaturation state. It is critical to define the concentrations of the reactants required accordingly in order to tailor the crystal size and shape. If nucleation dominates over growth, finer crystal size will be obtained. The nucleation step is a very critical step and the conditions of the reactions at this initial step define the crystal obtained. By definition, nucleation is an initial phase change in a small area such as crystal forming from a liquid solution. It is a consequence of rapid local fluctuations on a molecular scale in a homogeneous phase that is in a state of metastable equilibrium. Total nucleation is the sum effect of two categories of nucleation—primary and secondary. In primary nucleation, crystals are formed where no crystals are present as initiators. Secondary nucleation occurs when crystals are present to start the nucleation process. It is this consideration of the significance of the initial nucleation step that forms the basis for this CPF methodology.

In the CPF methodology, the reactants are dissolved in a solution preferably at ambient temperature or if needed, at a slightly elevated temperature but preferably not more than 100° C. Selection of inexpensive raw materials and the proper solvent are important aspects of this invention. The purity of the starting materials are also important since this will affect the purity of the final product which may need specified purity levels required for its performance specifications. As such, low cost starting materials which can be purified during the preparation process without significantly increasing the cost of processing must be taken into consideration. For instance, if a preferred starting raw material is a carbonate salt, one can start with a chloride salt as most reactants from rock processing are chloride salts. There may be some impurities in this chloride salt that may need to be removed and depending on the ease of impurity reduction, this chloride salt can be converted to the carbonate salt and at the same time remove any impurity or reduce the impurity levels.

CPF uses conventional equipment in an innovative way to produce the nanosize nuclei required for the final product. CPF utilizes a reactor fitted with a gas diffuser to introduce gas into the solution thereby creating bubbles. An agitator vigorously disperses the solution simultaneously with the bubble formation, as the second reactant is introduced into the first solution. The combination of gas flow and agitation provides a bubble surface. The bubble surface serves as the interface of contact between the molecules of the first solution and the molecules of the second solution thereby providing a surface reaction.

A surface reaction is the adsorption of one or more reactants from a gas, liquid or dissolved solid on a surface. Adsorption may be a physical or chemical adsorption.

The CPF process creates a film of the adsorbate on the bubble surface of the adsorbent. The bubble surface is the adsorbent and the adsorbates are the reactants in the solution. As illustrated in FIG. 6A, a bubble is formed from solution due to the simultaneous introduction of gas and agitator speed. Different size bubbles can be formed depending on gas flow rates. The size of the bubbles defines the surface area of contact between the molecules and this relates to the degree of nucleation which influences the particle size.

In FIG. 6B, the top view of this complexcelle is shown schematically. The complexcelle comprises gas bubble, 61, with a bubble surface, 62, shown above the surface of the solution, 68. The first reactant cation, 63, the first reactant anion, 64, the second reactant cation, 65 and the second reactant anion, 66, are all on the bubble surface. Solvent is not illustrated in the schematic diagram but it is understood that the solvent molecules are present. In FIG. 7, an illustration of this surface pathway is diagrammed showing the start of bubble formation, 61, from the bulk of the solution, the surface nucleation on the bubble surface, 62, which forms the complexcelle having reactants ions, 63-66, and the separation of this complexcelle from the bulk of the solution. The water molecules, 67, or solvent molecules are shown. This is a very dynamic state as the solution is vigorously and continuously mixed during the time of the addition of the second reactant solution into the first reactant solution. Furthermore, bubbles are formed within the bulk of the solution and the general direction is for these bubbles to move towards the top surface of the solution. The agitation rate enhances the rise of these bubbles to the surface and mixes the solution vigorously so that there is significant turnover of these reactants and their bubbles allowing fresh surface bubbles to continually be available for complexcelle formation. It will be realized that the above mechanism is a postulated mechanism and the present invention should not be construed as being limited to this particular pathway.

Figure 4:
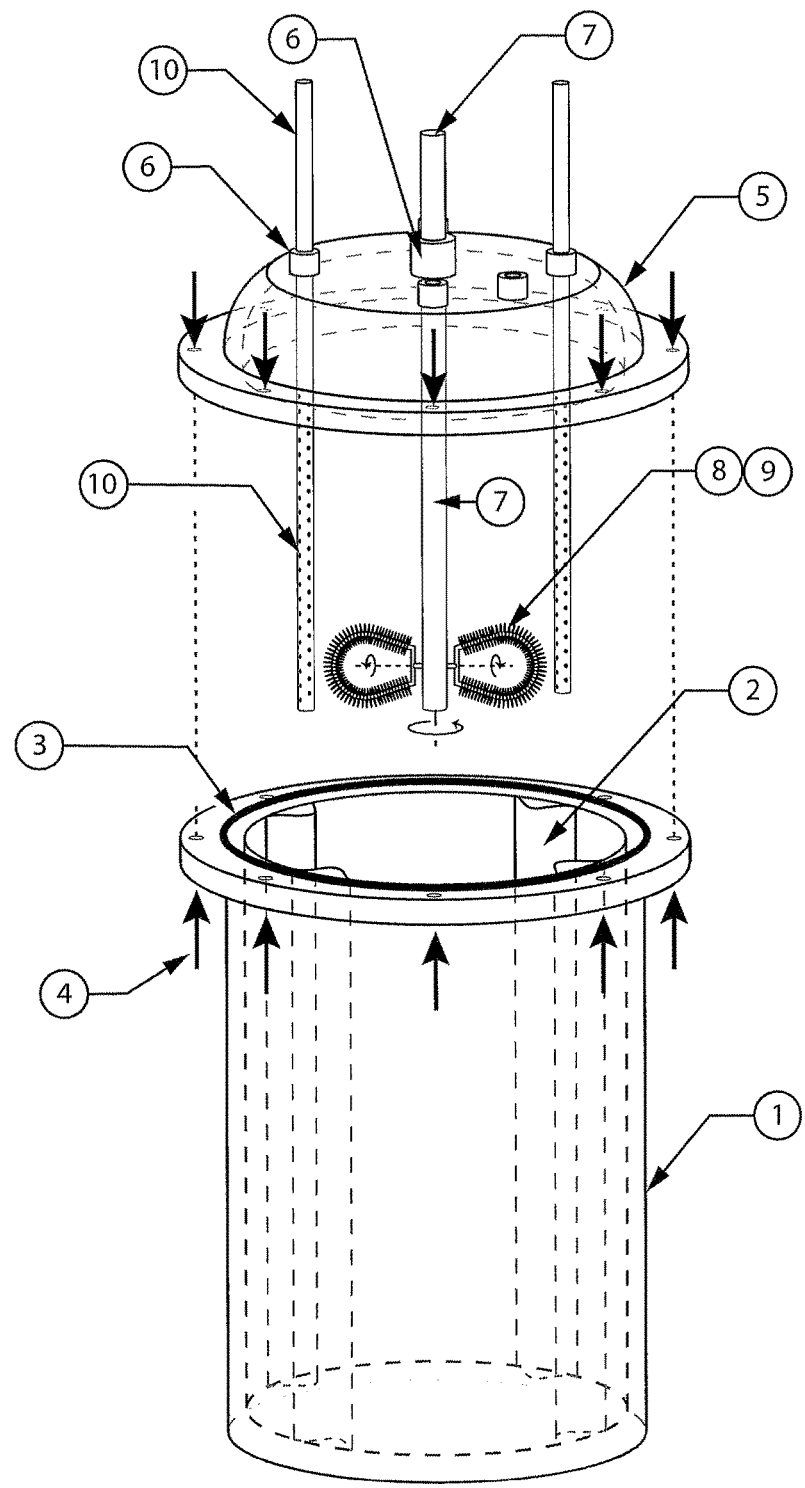
FIG. 4 illustrates a reactor vessel with gas inlet tubes and agitator with special blades.

It is preferred that the gas be introduced directly into the solution without limit to the method of introduction. The gas can be introduced into the solution within the reactor by having several gas diffusers, such as tubes, located on the side of the reactor, wherein the tubes have holes for the exit of the gas as illustrated in FIG. 4. Another configuration is to have a double wall reactor such that the gas passes through the interior wall of the reactor. The bottom of the reactor can also have entry ports for the gas. The gas can also be introduced through the agitator shaft, creating the bubbles upon exiting. Several other configurations are possible and the descriptions of these arrangements given herein are not limited to these. Throughout the description the point of gas being introduced into the liquid is a gas diffuser.

In one embodiment an aerator can be used as a gas diffuser. Gas diffusing aerators can be incorporated into the reactor. Ceramic diffusing aerators which are either tube or dome-shaped are particularly suitable for demonstration of the invention. The pore structures of ceramic bubble diffusers produce relatively fine small bubbles resulting in an extremely high gas to liquid interface per cubic feet per minute (cfm) of gas supplied. This ratio of high gas to liquid interface coupled with an increase in contact time due to the slower rate of the fine bubbles accounts for the higher transfer rates. The porosity of the ceramic is a key factor in the formation of the bubble and significantly contributes to the nucleation process. While not limited thereto for most configurations a gas flow rate of at least one liter of gas per liter of solution per minute is suitable for demonstration of the invention.

A ceramic tube gas diffuser on the sides of the reactor wall is particularly suitable for demonstration of the invention. Several of these tubes may be placed in positions, preferably equidistant from each other, to create bubbling more uniformly throughout the reactor. The gas is preferably introduced into the diffuser within the reactor through a fitting connected to the header assembly which slightly pressurizes the chamber of the tube. As the gas permeates through the ceramic diffuser body, fine bubbles start being formed by the porous structure of the material and the surface tension of the liquid on the exterior of the ceramic tube. Once the surface tension is overcome, a minute bubble is formed. This small bubble then rises through the liquid forming an interface for transfer between gas and liquid before reaching the surface of the liquid level.

A dome-shaped diffuser can be placed at the bottom of the reactor or on the sides of the reactor. With dome shape diffusers a plume of gas bubbles is created which is constantly rising to the surface from the bottom providing a large reactive surface.

A membrane diffuser which closes when gas flow is not enough to overcome the surface tension is suitable for demonstration of the invention. This is useful to prevent any product powder from being lost into the diffuser.

In order to have higher gas efficiencies and utilization, it is preferred to reduce the gas flow and pressure and expend less pumping energy. A diffuser can be configured such that for the same volume of gas, smaller bubbles are formed with higher surface area than if fewer larger bubbles are formed. The larger surface area means that the gas dissolves faster in the liquid. This is advantageous in solutions wherein the gas is also used to solubilize the reactant by increasing its solubility in the solution.

Smaller bubbles also rise more slowly than the larger bubbles. This is due to the friction, or surface tension, between the gas and the liquid. If these bubbles start from the same position or depth in the reactor, the larger bubbles reach the surface more quickly than several smaller bubbles. The smaller bubbles will have more liquid as it rises. The bubble surface interface between the two reactants determines the nucleation rate and size can therefore be tailored by controlling the bubble size formation.

Nozzles, preferably one way nozzles, can be used to introduce gas into the solution reactor. The gas can be delivered using a pump and the flow rate should be controlled such that the desired bubbles and bubble rates are achieved. A jet nozzle diffuser, preferably on at least one of the sides or bottom of the reactor, is suitable for demonstration of the invention.

The rate of gas introduction is preferably sufficient to increase the volume of the solution by at least 5% excluding the action of the agitator. In most circumstances at least about one liter of gas per liter of solution per minute is sufficient to achieve adequate bubble formation. It is preferable to recycle the gas back into the reactor.

Transfer of the second reactant solution into the first reactor solution is preferably done using a tube attached to a pump connecting the solution to be transferred to the reactor. The tube into the reactor is preferably a tube with a single orifice or several orifices of a chosen predetermined internal diameter such that the diameter size can deliver a stream of the second solution at a given rate. Atomizers with fine nozzles are suitable for delivering the second solution into the reactor. The tip of this transfer tube can comprise a showerhead thereby providing several streams of the second solution reacting on several surface bubbles simultaneously. Nucleation is influenced not only by the concentration of the second solution but also by the instantaneous concentration of this solution as it reaches the surface bubble interface to form the complexcelle. In large scale production, the rate of transfer is a time factor so the transfer rate should be sufficiently rapid enough to produce the right size desired.

Figure 5:
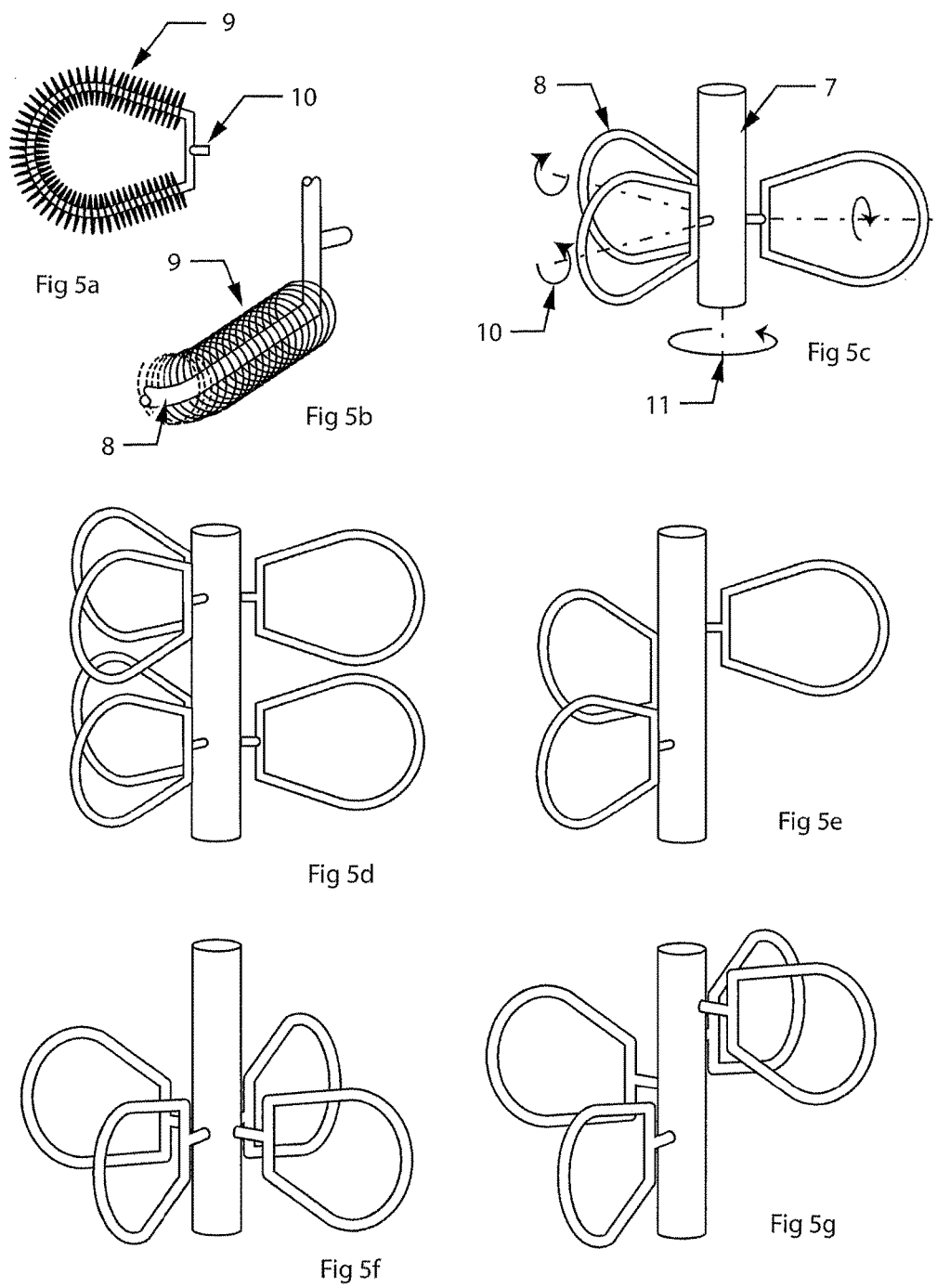

The agitator can be equipped with several propellers of different configurations, each set comprising one or more propellers placed at an angle to each other or on the same plane. Furthermore, the mixer may have one or more sets of these propellers. The objective is to create enough turbulence for rapid bubble formation and turnover. Examples of the agitator arrangements are shown in FIGS. 5 A-G but other similar formations are also possible and not limited to these. The function of this mixer is not only to insure homogeneity of the reaction mixture but also to assist in the bubble surface interaction which further influences the nucleation and is a determining factor in the size of the final particle.

Straight paddles or angled paddles are suitable. The dimensions and designs of these paddles determine the type of flow of the solution and the direction of the flow. One preferred blade design for CPF methodology is shown in FIG. 5 where the paddles consist of concentric rings wired around the paddle that create a frothing effect in the solution. In addition, the paddle can rotate on its own axis as well as rotate vertically by the axis of the mixer. This maximizes the bubbling effect even under slower agitation speed. A speed of at least about 100 rotations per minute (rpm's) is suitable for demonstration of the invention.

Figure 3:
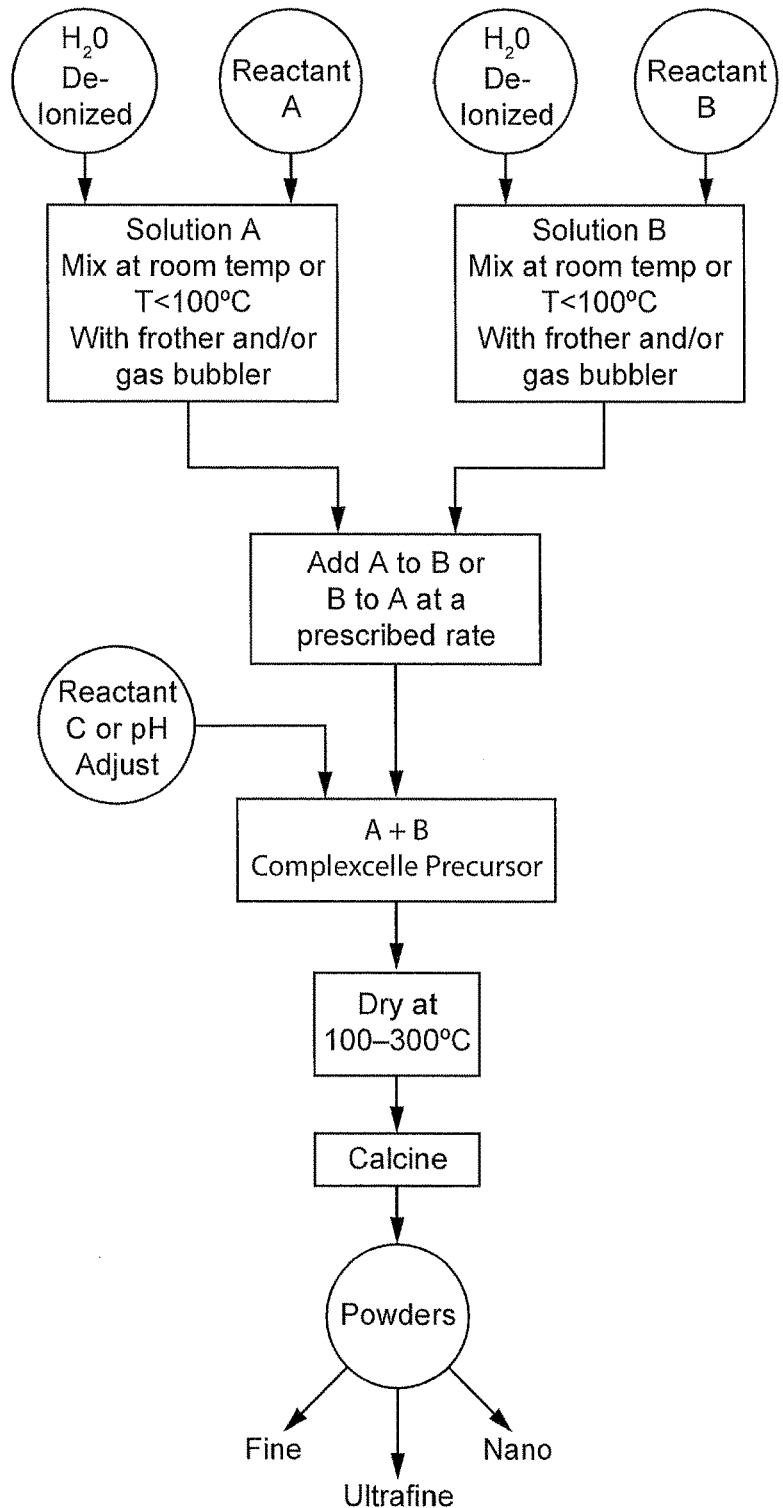
FIG. 3 is a flow chart of two reactants via the complexometric precursor formulation methodology for the synthesis of specialized powders.

The CPF process steps are demonstrated in the following examples below for a desired final product $M_jX_p$ such that $M=M_1\ M_2\ M_3$ (dual metal cation) or more and $X_p=O$. The flow chart in FIG. 3 shows a schematic outlay of the application of the CPF methodology to powders $M_jX_p$ as defined earlier for two reactants. It is obvious to someone skilled in the art that some modifications of these process steps would be done depending on the starting reactants, the desired precursor and the final desired product.

The starting raw materials for this process are chosen from Groups IA, IIA, IIIA, IVA and transition metals with the anion being monatomic or a polyanion selected from Groups IIIA, IVA, VA, VIA and VIIA. The final powders are cation compounds of anions or polyanions such that the formula is $M_jX_p$ where $M_j$ may be a single cation or a mixture of metal cations and $X_p$ may be a single anion, a single polyanion or a mixture of mixed anions and polyanions. In one embodiment $M_j$ comprises $M_1$ and $M_2$ wherein $M_1$ is lithium and $M_2$ is a transition metal. $M_j$ may be $M_1\ M_2\ M_3$ or more which are in stoichiometric or non-stoichiometric ratios and one or two may be small dopant amounts not more than 10 weight % of the final powder. The anion and polyanions may be oxides, carbonates, silicates, phosphates, borates, aluminates, silicophosphates, stannates, hydroxides, nitrates, oxycarbonates, hydroxycarbonates, fluorides, and oxyfluorides without limited thereto. Examples of these desired high performance powders are utilized in lithium ion battery applications, rechargeable batteries, bone implants, dental implants, structural ceramics, optical communication fibers, medical patches for drug delivery and specialized composites of metal-metal, metal-ceramic, glass-ceramic, glass-metal and others but not limited to these. The following discussion will illustrate the complexometric precursor formulation technology as applied to the synthesis of a lithium cathode material for lithium ion batteries. It is known that this art is not limited to this illustrative example but is applicable to numerous specialized high performance powders which are very expensive to manufacture today. The reactants in each solution are preferably no more than 30 wt. % of the solution.

A first reactant solution A is prepared by dissolving the solid in a selected solvent, preferably a polar solvent such as water but not limited thereto. It is understood that the choice of solvent depends on the type of final powder product desired, the formulated composition of the final powder and the physical characteristics required for achieving the performance of the final powder. The choice of the solvent is determined by the solubility of the solid reactant A in the solvent and the temperature of dissolution. It is preferred to dissolve at ambient temperature and to dissolve at a fast rate so that solubilization is not energy intensive. The dissolution may be carried out at a slightly higher temperature but preferably below 100° C. Only if other dissolution methods fail should a higher temperature be used. Other dissolution aids may be addition of an acid or a base. The solution concentration is preferably low as this influences concentration at the surface bubble interphase during the nucleation which determines the final powder size. It is important to select the proper chemical environment in order to produce the right nucleation to yield the desired final powder characteristics.

The cost of the starting materials should also be considered in the sum total of the process cost. Generally, lower cost raw materials are the salts of chlorides, nitrates, hydroxides and carbonates. Acetate salts and other compounds are usually prepared from these so these downstream compounds will be at higher cost. Nitrates and sulfates are readily soluble in water but they also release noxious gases during high temperature calcination. The purity of the starting materials is also a cost consideration and technical grade materials should be the first choice and additional inexpensive purification should be factored in the selection of the starting materials.

A second reactant solution B is also prepared in the same way as reactant solution A. The solid starting material and the solvent selected for dissolution should yield the fastest dissolution under mild conditions as possible.

The reactor, 1, set-up for both solutions A and B is diagrammed in FIG. 4. Baffles, 2, are preferred and are preferably spaced at equal distance from each other. These baffles promote more efficient mixing and prevent build-up of solid slags on the walls of the reactor. A top cover, 5, is latched to the bottom section of the vessel using a flange or bolts, 4. An O-ring, 3, serves to seal the top and bottom sections of the reactor. The mixer shaft, 7, and the propeller, 8-9, are shown in FIG. 4 and in more detail in FIG. 5. The mixer shaft is preferably in the center of the reactor vessel and held in place with an adaptor or sleeve, 6. Gas is introduced through a gas diffuser such as gas tubes, 10, which have small outlets on the tube for exit of the gas. These gas tubes are placed vertically into the reactor through the portholes of the top cover and held in place with adaptors, 6. The gas used for bubbling is preferably air unless the reactant solutions are air-sensitive. In this instance, inert gas is employed such as argon, nitrogen and the like. Carbon dioxide is also used if a reducing atmosphere is required and it can also be used as a dissolution agent or as a pH adjusting agent. Ammonia may also be introduced as a gas if this is preferable to use of an ammonia solution. Ammonia can form ammonia complexes with transition metals and a way to dissolve such solids. Other gases such as $SF_6$, HF, HCl, $NH_3$, methane, ethane or propane may also be used. Mixtures of gases may be employed such as 10% $O_2$ in argon as an example. Another porthole on the top cover of the reactor is for the transfer tube (not shown) and another porthole can be used for extracting samples, adding other reactant, as Reactant C for pH adjustment or other, and also or measurements of pH or other needed measurements.

The agitator blade illustrated in FIG. 5 with a concentric wire design is preferred over the regular paddle type since this assists in bubble formation and allows the solution system to be in a dynamic motion such that fresh bubble surfaces are continuously and rapidly produced as the second solution of reactant B is being transferred into the reactor containing solution of reactant A. The agitator blade has concentric wire wound, 9, and it can rotate on its axis, 10, as shown in a top view in FIG. 5A. A side view of this design is shown in FIG. 5B. FIGS. 5C-5G illustrate different arrangements of blades. The concentrically wound wires are not shown to simplify the diagrams. The blade is attached to the mixer shaft (7) as shown in FIG. 5C and one set of propellers with three blades rotate horizontally on their own axes (FIG. 5C-10) and also rotate vertically (FIG. 5C-11) simultaneously on the mixer shaft axis, 11. In FIG. 5D, two sets of propellers with three blades each are drawn which move as in FIG. 5C. There are three blades arranged alternately on the mixer shaft in FIG. 5E. In FIG. 5F, the arrangement is similar to FIG. 5C but there are two sets of propellers with four blades. In FIG. 5G, the four blades are arranged one above the other on the mixer shaft as in FIG. 5C. There can be many variations of these configurations with different number of blades, different blade dimensions, different plurality of blades in a set, several sets of blades, different angular orientation relative to each other, different number of coils per blade, etc. The blade configurations are not limited to these illustrations in FIG. 5.

The rate of transfer has a kinetic effect on the rate of nucleation. A preferred method is to have a fine transfer stream to control the concentration of the reactants at the bubble surface interface which influences the complexcelle formation and the rate of nucleation over the rate of crystal growth. For smaller size powder, a slower transfer rate will yield finer powders. The right conditions of the competing nucleation and growth must be determined by the final powder characteristics desired. The temperature of reaction is preferably ambient or under mild temperatures if needed.

Upon completion of the reaction of reactant A and reactant B, the resulting slurry mixture containing the intermediate complexcelle is dried to remove the solvent and to obtain the dried powder. Any type of drying method and equipment can be used and such drying is preferably at less than 350° C. Drying can be done using an evaporator such that the slurry mixture is placed in a tray and the solvent is released as the temperature is increased. Any evaporator in industrial use can be employed. The preferred method of drying is by using a spray dryer with a fluidized nozzle or a rotary atomizer. These nozzles should be the smallest size diameter although the size of the powder in the slurry mixture has already been predetermined by the reaction conditions. The drying medium is preferably air unless the product is air-sensitive. The spray dryer column should also be designed such that the desired moisture content is obtained in the sprayed particulates and are easily separated and collected.

The spray dried particles obtained by the CPF methodology are very fine and nanosize. Definitive microstructures or nanostructures by the CPF process are already formed during the mixing step. Novel microstructures or nanostructures looking like flowers or special layering such that these structures are called nanorose, nanohydrangea, or nanocroissant or other description depending on the formulation of the powder. Such structures also translate to the final powder after the calcination step.

After spray drying, the powder is transferred to a calciner. No crushing or milling is required since the spray dried powders are very fine. In large scale production, this transfer may be continuous or batch. A modification of the spray dryer collector such that an outlet valve opens and closes as the spray powder is transferred to the calciner can be implemented. Batchwise, the spray dried powder in the collector can be transferred into trays or saggers and moved into a calciner like a box furnace although protection from powder dust should also be implemented. A rotary calciner is also another way of firing the powder. A fluidized bed calciner is also another way of higher temperature heat treatment of the spray dried powder. The calcination temperature is determined by the composition of the powder and the final phase purity desired. For most oxide type powders, the calcination temperatures range from as low as 400° C. to slightly higher than 1000° C. After calcination, the powders are crushed as these are soft and not sintered. The CPF process delivers non-sintered material that does not require long milling times nor does the final CPF process require classifiers to obtain narrow particle size distribution. The particle sizes achievable by the CPF methodology are of nanosize primary and secondary particles and up to small micron size secondary particles ranging to less than 50 micron aggregates which are very easily crushed to smaller size. It should be known that the composition of the final powder influences the morphology as well.

A brief stepwise summary of the CPF methodology is given below.

A first solution or slurry solution of $M=M_1$ chosen from the metal chlorides, metal nitrates, metal hydroxides, metal acetates, metal carbonates, metal hydroxycarbonates, metal hydroxyl phosphates and metal hydroxysilicates but not limited to these would be prepared. The purity of the starting reactant for $M_1$ should be defined by the final purity desired and the degree of purification that may be done in a preliminary step.

A second solution or slurry solution of $M=M_2$ also chosen from the same metal salts as for the first solution. The purity of the starting reactant for $M_2$ should also be chosen on the basis of the final purity of the final product and the degree of purification needed in a preliminary step.

The solvent in both the first and second solution is preferably deionized water at acidic or basic pH and ambient temperature. An acid or a base may be added to the first or second solution to aid in solubilizing the reactants and/or the temperature may be increased but preferably not more than 100° C., and/or the solubilizing mixing rate be more vigorous and solubilizing time increased. If conditions require more adverse temperature and time, then the process may proceed as slurry solutions. Other solvents to dissolve the starting materials may also be used if water is insufficient for dissolution. Such solvents may be polar solvents as alcohols or non-polar solvents typically used in general organic preparations. It is important to consider raw material costs during the evaluation of the process so that production cost does not decrease the value-added performance advantages of the CPF powder.

A CPF reactor designed or configured so that gas may be introduced into the vessel is charged with the first solution. The gas may be air, argon, carbon dioxide, nitrogen, or mixtures of these preferably of normal purity. The gas may be inert for reactions that are adverse in air. Likewise, the gas may also be a possible reactant such as, for example, those reactions wherein carbon dioxide is utilized to produce carbonates or bicarbonates, or hydroxycarbonates and oxycarbonates but not limited to these.

The gas may be introduced by a gas diffuser such as gas tubes having holes in the tube from which the gas introduced from the inlet exits into the reactor vessel creating a vigorous flow and a bubbling solution with numerous fine microbubbles. The holes may be sized to insure bubbles are generated over the entire length of the tube.

The gas may also be introduced by mechanical gas diffusers with pumps that may circulate both gas and solution which also improves mixing of the solutions.

The gas flow rate, in conjunction with the mixing speed of the agitator, should be enough to create suspended micro bubbles such as a foamy solution.

An agitator blade is configured to produce vigorous mixing to produce a frothy slurry solution or frothy solution. The agitator blade may be a concentric loop to promote incorporation of the gas and the formation of fine bubbles. The concentric loop may rotate horizontally and vertically. In addition, the agitator blade may be dual, triple, quadruple, quintuple or other configuration and not limited to these. Depending on the height of the reactor vessel, several agitator blades may be used.

The mixing speed should be fast enough to maintain bubbles of first solution such that the second solution being added drops into the bubbles of the first solution creating a micro or nano contact onto the surface of the bubbles of the second solution.

The first solution may be added to the second solution. The resulting product performance may be different depending on the method of addition.

The mixing temperature is preferably ambient or slightly elevated but not more than 100° C.

The resulting mixture of first and second solutions may be a solution or a slurry mixture.

The resulting reaction product is dried by any drying method using known industrial equipment including spray dryers, tray dryers, freeze dryers and the like, chosen depending on the final product preferred. The drying temperatures would be defined and limited by the equipment utilized. The desired drying temperatures are usually from 200-325° C.

The resulting mixture is continuously agitated as it is pumped into the spray dryer head if spray dryers, freeze dryers or the like are used. For tray dryers, the liquid evaporates from the surface of the solution.

The dried powders are transferred into the next heating system batch-wise or by means of a conveyor belt. The second heating system may be a box furnace utilizing ceramic trays or saggers as containers, a rotary calciner, a fluidized bed, which may be co-current or counter-current, a rotary tube furnace and other similar equipment but not limited to these. The calcination temperature depends on the final product requirements and could be as high as 1000° C. and up to as much as 3000° C. or more as in the case of glassy silicates.

The heating rate and cooling rate during calcinations depend on the type of final product desired. Generally, a heating rate of about 10° C. per minute is preferred but the usual industrial heating rates are also applicable.

Calcining may also require inert gases as in the case of those materials that are sensitive to oxidation. As such, a positive flow of the inert gas may be introduced into the calcining equipment.

The final powder obtained after the calcining step is a fine, ultrafine or nanosize powder that does not require additional grinding or milling as is currently done in conventional processing. Particles are relatively soft and not sintered as in conventional processing.

The final powder is preferably characterized for surface area, particle size by electron microscopy, porosity, chemical analyses of the elements and also the performance tests required by the preferred specialized application.

The CPF methodology for the production of fine, ultrafine and nanosize powders offers several advantages. One of the improvements is reduction in the number of processing steps. There is no significant milling and firing sequence in the CPF method. The total production time for this CPF methodology route to fine, ultrafine and nanosize powders is less than or equal to 25% of current conventional processing technologies for such similar powders. Final powder production cost using CPF methodology can be significantly reduced by as much as 75-80% of current conventional processing. Performance improvements of these powders produced by CPF are at least 15% or more than those traditional ceramic powders currently produced by presently known technologies. The CPF process can be utilized for the preparation of different types of powders and is not limited to a group of powder formulations.

This CPF process can be applied to make the desired powder for the lithium ion batteries, such as lithium cobalt oxide, lithium nickel oxide, lithium manganese oxide and the doped lithium metal oxides of this type, the mixed lithium metal oxides of said metals and the doped derivatives, lithium iron phosphate and the doped lithium iron phosphates as well as other lithium metal phosphates, lithium titanates and other materials for the storage batteries. The CPF process can be applied to produce medical powders such as the specialized calcium phosphates for medical applications like bone implants. The CPF process can also be used for the preparation of other advanced ceramic powders such as lithium niobates and lithium tantalates, lithium silicates, lithium aluminosilicates, lithium silicophosphates and the like. Semiconductor materials can also be prepared by the CPF process as well as specialized pharmaceutical drugs. High surface area catalysts can be made by the CPF process and such catalysts would have higher catalytic activity as a result of a finer particle size, higher surface area and higher porosity made possible by the CPF methodology. Specialized coatings requiring nanosize powders can be economically prepared by the CPF method. This CPF process can also be used for the preparation of non-lithium based materials. The versatility of this methodology allows itself to be easily modified in order to achieve the customized, tailored powder needed. Furthermore, this methodology is easily adapted for large scale industrial production of specialized powders requiring a narrow particle size distribution and definitive microstructures or nanostructures within the fine, ultrafine or nanosize powders. Having a cost effective industrial scale powder for these specialized applications will allow commercial development of other devices otherwise too costly to manufacture.

The complexometric precursor formulation methodology or CPF, creates a fine, ultrafine or nanosize powders via the formation of a complexcelle of all the ions of the desired powder composition on a bubble surface interface. CPF has many advantages over known prior art.

Only the main reactants for the chemical formula of the compound to be synthesized are used. This will reduce the cost of the raw materials. The starting raw materials can be low cost. Technical grade materials can be used and if needed, purification can be done in-situ.

Total processing time is significantly less, about ⅕ to ½ of the processing times for the present industrial processes.

Special nanostructures are preformed from the complexcelle which are carried over to the final product thus enhancing the performance of the material in the desired application. For the purposes of the present invention nanostructures are defined as structures having an average size of 100 to 300 nm primary particles.

Neither surfactants nor emulsifiers are used. The initiation reaction occurs at the surface of the bubble interface. In fact, it is preferable that surfactants and emulsifiers are not used since they may inhibit drying.

Size control can be done by the size of the bubbles, concentration of the solutions, flow rate of the gas, transfer rate of second reactant into the first reactant.

No repetitive and cumbersome milling and classification steps are used.

Reduced calcination time can be achieved and repetitive calcinations are typically not required.

Reaction temperature is ambient. If need for solubilization, temperature is increased but preferably not more than 100° C.

Tailored physical properties of the powder such as surface area, porosity, tap density, and particle size can be carefully controlled by selecting the reaction conditions and the starting materials.

The process is easily scalable for large scale manufacturing using presently available equipment and/or innovations of the present industrial equipment.

EXAMPLES

Preparation of Coin Cells

The standard practice for coin cell testing has been used in all example and is described herein for reference. The material was made into electrodes in the same way and tested in an Arbin battery cycler (BT-2000) under the same cycling conditions of voltage and current. As such, side-by-side comparison of the battery cycling performances definitively exemplifies the advantages of the CPF methodology over current industrial production processes.

Electrodes were prepared by mixing 80 wt. % of active material, 10 wt. % of carbon black, and 10 wt. % PVDF (polyvinylideneflouride) in NMP (1-methyl-2-pyrrolidone). The resulting slurry was cast on aluminum foil and dried in a vacuum oven at 115° C. for 24 h. CR2032-type coin cells were fabricated in an argon-filled glove box using lithium metal as the counter electrode. The cathode weight was around 4 mg per electrode. The electrolyte was a 1 M solution of $LiPF_6$ (lithium hexafluorophosphate) in a 1:1:1 volume mixture of EC:DMC:DEC (ethylene carbonate, dimethyl carbonate, and diethyl carbonate). The separator (Celgard 2400) was soaked in the electrolyte for 24 h prior to battery testing. Coin-cells were galvanostatically charged/discharged on the Arbin battery cycler at the stipulated current densities. Tests were done at ambient temperature. Both comparative example and the example coin cells were done at the same time under the same conditions.

Examples

Comparative Example 1

Commercially available lithium cobalt oxide powder was obtained from Sigma Aldrich and characterized by field emission SEM (FIGS. 8A and 8B) and XRD (FIG. 9) as well as by coin cell testing.

The scanning electron micrograph of this commercial $LiCoO_2$ in FIG. 8A has a magnification of 2000× and was taken as received. A second micrograph in FIG. 8B has a magnification of 25000×. In FIG. 8A, the particles are acicular and have several large agglomerates more than 10 microns that fused together during the calcination stage. On higher magnification, layers of the particles are noted for some particles that were not fused but it is also shown that there are smooth areas from fusion of particles. This is often found in solid state processes which are a calcination of blended mixed solids of the reactants that combine by sintering at high temperature. It is expected that the particles so derived would be large in size and will need to be milled and classified to obtain the size distribution preferred.

The X-ray powder diffraction in FIG. 9 shows a single phase crystalline $LiCoO_2$.

The capacity of this lithium cobalt oxide prepared commercially is shown in FIG. 14 together with Example 2 prepared by CPF.

Example 2

Lithium cobalt oxide was prepared using a reactor vessel as shown in FIG. 4 with a mixer having an agitator blade as shown in FIG. 5. In one reactor, a weighed amount of lithium carbonate (46.2 grams, 99% purity) was added to the reactor containing one liter of deionized water. Carbon dioxide gas was allowed to flow through the reactor using a gas tube bubbler on the side or a diffuser bubbler at the bottom of the vessel. A second reactor also equipped with a tube bubbler or a diffuser bubbler contained a weighed amount of cobalt carbonate (120.2 grams, 99% purity) and one liter of deionized water. Carbon dioxide gas was allowed to flow through the bubblers. Ammonia, 250 mL, was added to the second reactor. After a given amount of time to allow dissolution or vigorous mixing of the corresponding reactants, the cobalt solution was pumped into the lithium solution at a rate of at least 1 L/h. Reaction temperature was ambient and gas flow maintained a sufficient amount of bubbles. The resulting mixture was passed through a spray dryer. The outlet temperature was 115° C. The dried powder was collected and placed in a sagger and fired in a box furnace in air for 5 h at 900° C. Scanning electron micrographs (FIGS. 10-12) and X-ray powder diffraction patterns (FIG. 13) were taken of the dried powder and the fired powder.

The slurry after mixing the reactants was placed on a glass surface to dry in air. The air-dried powder was analyzed by field emission SEM and the micrograph is shown in FIG. 10. It is shown that there is some nanostructure already formed from the CPF methodology. The particles appear to align as staggered layers. Primary particles are in the nanometer range as shown by several individual particles interspersed within.

In FIG. 11A (10000×) and 11B (25000×), the same nanostructure can be seen after spray drying the slurry mixture from the mixing step. The layering structure is very clearly shown in FIG. 11B. That the nanostructure still remains after drying indicates that this formation is an advantage of the CPF process.

After the calcination step for 5 h at 900° C., the layered nanostructure observed in FIGS. 10 and 11 still remains intact in the calcined powder as shown in the SEM micrograph in FIG. 12 at 10000× which consists of loosely bound layers of the particles allowing ease of Li migration within the structure during battery cycling. Such flaky structure resembles a "nanocroissant" and has already been formed from the precursor feed to the spray dryer and thereon to the calciner.

Coin cells were prepared as described in the preparation of coin cells. The capacity of this lithium cobalt oxide prepared by the CPF methodology is shown in FIG. 14 plotted with the commercial sample in Example 1 for 500 cycles at C/20. From the data, the commercial sample of Example 1 performed lower, as shown by the lower discharge capacity. Both powders decreased in capacity with increase in the number of cycles. However, the powder prepared by the CPF process exhibited higher capacity up to 400 cycles compared to the commercial sample of Example 1. At 300 cycles, the capacity of the CPF powder of Example 2 was 110 mAh/g compared against the capacity of the commercial sample at 300 cycles which was 80 mAh/g.

Example 3

The powders in Examples 1 and 2 were refired at 900° C. for another 5 h. Coin cells were prepared as described. A comparison of the battery cycling tests is given in FIG. 15 at 1 C for 500 cycles.

In the battery cycling tests at a higher C rate of 1 C, the lithium cobalt oxide powder from Example 2 that was refired again performed significantly better than the commercial powder that was also refired at the same temperature and for the same time period. The capacity of the commercial sample dropped from 120 mAh/g to 20 mAh/g after 200 cycles. The CPF sample had a capacity of 100 mAh/g after 300 cycles and 80 mAh/g at 400 cycles.

The present invention provides a cathode for a battery wherein the battery has a capacity of at least 80 mAh/g after 200 cycles. More preferably the present invention provides a cathode for a battery wherein the battery has a capacity of at least 80 mAh/g after 500 cycles at discharge rate of 1 C at room temperature from 4.2 volts to 3 volts. Even more preferably the present invention provides a cathode for a battery wherein the battery has a capacity of at least 150 mAh/g after 500 cycles at discharge rate of 1 C at room temperature from 4.6 volts to 2.5 volts.

The scanning electron micrographs of the refired samples are shown in FIGS. 16 and 17 at the same magnification of 10000× for comparison. While recalcination for another 5 h has caused more fusion in both samples, it is noted that the commercial sample of lithium cobalt oxide has larger fused particles and the layers were also more fused together. The lithium cobalt sample prepared by this invention still retained much of the layered structure and the additional firing has not diminished battery performance significantly compared to the commercial sample.

Example 4

The same procedure described in Example 2 was used in this example but with the added nickel and manganese compounds to illustrate the synthesis of multicomponent lithium oxides by the CPF methodology. The formulation made is $Li_{1.20}Ni_{0.18}Mn_{0.50}Co_{0.12}O_2$ which is a high energy lithium nickel manganese cobalt oxide material for lithium ion batteries that would meet the electric vehicle performance standards.

Nickel hydroxide (16.8 grams, 99%) and cobalt carbonate (14.4 grams, 99.5%) were weighed out and placed in a reactor vessel described in FIG. 4 equipped with a tube bubbler and an agitator as shown in FIG. 5 already containing one liter of deionized water and 140 mL of acetic acid (99.7%). The solids were mixed at ambient temperature to obtain a solution of both metals. Manganese acetate (123.3 grams) was then weighed out and added to the same reactor. A similar reactor was also set-up to contain one liter of deionized water and lithium carbonate (44.7 grams, 99%). Carbon dioxide was bubbled through the gas bubbler. Ammonia, 100 mL, was added to the Li-containing reactor. The Co, Ni, Mn solution was then pumped into the Li-containing reactor at about 3.5 L/h at ambient temperature. Additional ammonia, 155 mL, was then added to the mixture to maintain pH of at least 9.0. The resulting mixture was then dried in a spray dryer. Inlet temperature was at 115° C. The Li—Co—Ni—Mn spray dried powder was then placed in a sagger and calcined at 900° C. for 5 h. The fired powder was very soft and was just crushed. No classification was done.

Scanning electron micrographs (FIGS. 18-20) and X-ray powder diffraction patterns (FIG. 21) were taken of the dried powder and the fired powder. Note that the SEM data in FIGS. 18A (2000×) and 18B (10000×) before spray drying and FIGS. 19A (5000×) and 19B (10000×) after spray drying show a "nanorose" or a "nanohydrangea" structure as the nanostructures formed by the layering of the particles look similar to these flowers. The particles form nanostructure layers at the mixing stage where the complexcelle nucleation begins and this same nanostructure is retained even after spray-drying. The calcined powder has discrete nanoparticles about 200-300 nm and some very loose agglomerates as shown in the SEM micrographs in FIGS. 20A (10000×) and 20B (25000×).

A crystalline lithium nickel manganese cobalt oxide was obtained in the X-ray powder diffraction pattern in FIG. 21.

Coin cells were prepared as described in Example 1. The capacity of this lithium nickel cobalt manganese oxide prepared by the CPF methodology is shown in FIGS. 22-24.

In FIG. 22, the capacity of this lithium nickel manganese oxide was relatively constant at an average of 125 mAh/g for 500 cycles at a high C rate of 1 C. This is indicative of potential high performance in lithium ion batteries for electric vehicle applications. Capacity retention for as much as 500 cycles at 1 C is excellent performance.

In FIG. 23A, the battery performance for the same material was done in a temperature controlled chamber at 30° C. and plotted showing different cycling rates from C/20 to 1 C. As shown, the capacity decreases as the C rate increases. At C/20, the capacity was about 250 mAh/g and at 1 C, about 150 mAh/g.

In FIG. 23B, the C rates shown are C/10, C/3 and 1 C for 5 cycles each. Capacities were 240 mAh/g, 180 mAh/g and 150 mAh/g, respectively. The battery cycling tests were done at 30° C. in a temperature controlled chamber.

In FIG. 24A, the battery coin cells were placed in the temperature controlled chamber at 25° C. Cycling rates were taken from C/20 to 1 C. The capacity at C/20 was almost 300 mAh/g. At 1 C, the capacity was at 180 mAh/g. This is attributed to a better controlled environment. The cycling data at 1 C for 500 cycles is shown in FIG. 24B. Capacity was constant for 500 cycles at 1 C rate at 25° C.

Example 5

A cathode material, LMPO$_4$, such as LiFePO$_4$, which is also preferably coated with carbon to promote conductivity and may be doped or not, can be made by this CPF methodology. The iron source can be selected from divalent salts of iron. The phosphate source can be H$_3$PO$_4$, ammonium phosphates, ammonium dihydrogen phosphates and the like. Iron is either a +2 or a +3 ion. The Fe$^{+2}$ salt is preferred over the Fe$^{+3}$ salt. The reactions must be done under inert atmosphere to prevent the oxidation of Fe$^{+2}$ to Fe$^{+3}$. A reducing atmosphere can also be used to reduce the Fe$^{+3}$ to Fe$^{+2}$.

To illustrate the preparation of LiFePO$_4$, an iron salt soluble in aqueous solvents like water is prepared in one reactor. Such salts can be iron oxalate, iron nitrate and others. Carbon dioxide gas can be introduced in the solution. Phosphoric acid is also added to the solution. In a second reactor, a lithium salt such as lithium carbonate, lithium hydroxide and the like is dissolved in water under carbon dioxide gas. The iron phosphate solution in reactor 1 is then slowly transferred into the lithium solution in the second reactor. Ammonia solution may be introduced simultaneously as the iron solution or at the end of the transfer of the iron solution. The slurry solution is then dried using a spray dryer and the spray dried powder is calcined under inert atmosphere to obtain LiFePO$_4$. If a dopant is added from selected metals, this dopant solution must be dissolved in any reactor. The carbon coating can be attained by adding a carbon material to obtain not more than a 10 wt. % carbon in the product. The coating may comprise alkali or alkaline earth metals, Group III A and IV A and transition metals or an organic or another inorganic compound.

The compound $M_jX_p$ prepared by the complexometric precursor formulation methodology of claim 14 wherein said coating comprises carbon or a carbon-containing compound Other types of phosphate compounds such as calcium phosphate may be made in a similar way to obtain a calcium phosphate nanopowder that can be used for bone implants and other medical applications as well as dental applications.

Example 6

Lithium cobalt oxide was prepared using a reactor vessel as in FIG. 4 with agitator blades as in FIG. 5. Cobalt nitrate hexahydrate, 149.71 grams, was weighed into the reactor containing one liter of deionized water. Air was bubbled through the solution using fritted gas tubes. Lithium hydroxide monohydrate, 25.86 grams, was dissolved in deionized water, 1 L, in a second container then transferred into the cobalt solution. Ammonia (28%), 125 mL, was added to the mixture. The mixture was spray dried and calcined at 900° C. for 5 h.

The SEM micrographs in FIGS. 25 and 26 show the particle size transitions for the spray dried material to the fired product at 10000×. Primary particles are about 200-300 nm and secondary ones are about 3.5 microns. The particles are nanosize to ultrafine size. There is no significant sintering observed from micrographs taken after the calcination step. No classification was done after the calcination step; the fired powder was lightly crushed.

The X-ray powder diffraction pattern in FIG. 27 shows a crystalline lithium cobalt oxide phase.

The coin cell tests in FIG. 28 show a discharge capacity of about 150 mAh/g with slight decrease after 50 cycles at ambient temperature at 0.05 C rate.

Example 7

Example 2 was repeated. Lithium carbonate (46.6 grams) was weighed and dissolved in 1 L of deionized water under CO$_2$ gas at ambient temperature. In another vessel with a liter of deionized water and CO$_2$, 120.6 grams of cobalt carbonate was weighed and 250 mL of ammonium hydroxide was also added. The second mixture was transferred into the lithium solution in about one hour, spray dried (inlet temperature of 220° C.) then calcined for 5 h at 900° C.

The X-ray powder diffraction pattern in FIG. 29 is a crystalline lithium cobalt oxide.

Particle size of the calcined powder was done by FESEM (field emission scanning electron microscopy) in FIGS. 30 A-C.

Coin cell test data is given in FIG. 31 for Example 7 and the commercial sample (Sigma Aldrich) done at room temperature for 500 cycles at 1 C. The product prepared by the CPF process is showed a capacity of 100 mAh/g at 400 cycles while the commercial sample had a capacity of about 70 mAh/g.

Example 8

The calcined product in Example 7 was fired again for another 5 h at 900° C. The X-ray powder diffraction pattern is given in FIG. 32 which is a single phase crystalline lithium cobalt oxide.

The refired LiCoO2 had particle sizes similar to Example 7 which is a single fire at 5 h at 900° C. The SEM photos in FIG. 33 are at magnifications 5000×, 10000×, and 25000×.

A comparison of Example 8 against the refired commercial sample in Example 3 is shown in FIG. 34. The battery performance after 250 cycles dropped to 30 mAh/g capacity for the commercial sample but Example 8 exhibited 120 mAh/g at 250 cycles and was 100 mAh/g after 500 cycles. The coin cell conditions were RT at 1 C. These results indicate superior advantage of the complexcelle formation of the CPF synthetic method over a similar product prepared by traditional methods.

Example 9

The reactants in Example 7 can be prepared in the same manner. Another compound such as aluminum oxide or aluminum fluoride can be added to the second solution already containing cobalt as a dopant. The amount of this dopant compound depends on the preferred dopant concentration for enhanced performance but is usually less than 10% by weight of the total composition. In some cases, more than one dopant is added depending on the desired improvement in performance in the presence of the dopant. One of these is improvement in battery cycling results such as longer cycle life and higher stable capacity.

Dopant starting materials are usually salts of oxides, hydroxides, carbonates favorably over the nitrates, sulfates, acetates and the like. Among those already used by other researchers are alkaline metals and transition metals such as Al, Ti, Zr, Mg, Ca, Sr, Ba, Mg, Cr, Ga, B and others but not limited to these. A general formula for doped lithium cobalt oxide would be $LiCo_{1-p}D_pO_2$.

Example 10

The CPF process can also be used to make other lithium metal oxides of formula $LiMO_2$ such as $LiMn_2O_4$, $LiNiO_2$, and other formulations of Example 2, as well as the doped derivatives and coated derivatives of the formula $LiM_{1-p}D_pO_2$.

The anion may also be a polyanion such as oxyfluorides and others. These formulations will be then be variants of $LiM_{1-p}D_pO_{2-x}F_x$ and the like.

Starting materials for these would be chosen from their corresponding salts, preferably oxides, carbonates, hydroxides, nitrates, acetates and others that can be dissolved preferably under mild conditions of time, temperature and pressure, rendering easily scale-up to industrial production. Another specialized cathode is a core shell lithium transition metal oxide wherein a CPF prepared coating compound forms the shell of the lithium metal oxide core in order to improve surface characteristics for better temperature stability, better structural integrity over longer cycles, and improved capacity.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A compound $M_jX_p$ prepared by the complexometric precursor formulation methodology wherein:
   $M_j$ is at least one positive ion selected from the group consisting of alkali metals, alkaline earth metals and transition metals and j represents the moles of said positive ion per mole of said $M_jX_p$; and
   $X_p$ is an anion or polyanion selected from the group consisting of at least one anion or polyanion of Groups IIIA, IVA, VA, VIA and VIIA; and p represents the moles of said anion or polyanion per mole of said $M_jX_p$;
   wherein said compound has a particle size of less than 1 micron and said compound has a surface area of at least 1 $m^2$/gm and wherein said compound is a layered nanostructure wherein said $M_j$ comprises $M_1$ and $M_2$ and wherein $M_1$ is lithium and $M_2$ is a transition metal wherein said transition metal is selected from the group consisting of Ni, Mn and Co and wherein said compound has the formula $LiMn_xCo_yNi_zO_2$ wherein $x+y+z \leq 1$.

2. The compound $M_jX_p$ prepared by the complexometric precursor formulation methodology of claim 1 wherein said compound is $Li_{2-x-y-z}Ni_xMn_yCo_zO_2$ wherein $x+y+z \leq 1$ and at least one of said x, y or z is not zero.

3. The compound $M_jX_p$ prepared by the complexometric precursor formulation methodology of claim 2 wherein said compound is $Li_{2-x-y-z}Ni_xMn_yCo_zO_2$ wherein $x+y+z \leq 1$ and none of said x, y or z are zero.

4. The compound $M_jX_p$ prepared by the complexometric precursor formulation methodology of claim 1 further comprising a dopant.

5. The compound $M_jX_p$ prepared by the complexometric precursor formulation methodology of claim 4 wherein said dopant is selected from the group consisting of alkali or alkaline earth metals, Group III A, IV A and transition metals.

6. The compound $M_jX_p$ prepared by the complexometric precursor formulation methodology of claim 4 comprising up to 10 weight % of said dopant.

7. The compound $M_jX_p$ prepared by the complexometric precursor formulation methodology of claim 1 wherein said compound has a particle size of 100 to 300 nm.

8. A compound $M_jX_p$ prepared by the complexometric precursor formulation methodology wherein:
   $M_j$ is at least one positive ion selected from the group consisting of alkali metals, alkaline earth metals and transition metals and j represents the moles of said positive ion per mole of said $M_jX_p$; and
   $X_p$ is an anion or polyanion selected from the group consisting of at least one anion or polyanion of Groups IIIA, IVA, VA, VIA and VIIA; and p represents the moles of said anion or polyanion per mole of said $M_jX_p$;
   wherein said compound has a particle size of less than 1 micron and said compound has a surface area of at least 1 $m^2$/gm and wherein said compound is a layered nanostructure selected from the group consisting of lithium cobalt oxide, lithium nickel oxide, lithium manganese oxide, and lithium mixed oxides of cobalt, nickel and manganese.

9. A composition comprising a compound $M_jX_p$ prepared by the complexometric precursor formulation methodology wherein:
  $M_j$ is at least one positive ion selected from the group consisting of alkali metals, alkaline earth metals and transition metals and j represents the moles of said positive ion per mole of said $M_jX_p$; and
  $X_p$ is an anion or polyanion selected from the group consisting of at least one anion or polyanion of Groups IIIA, IVA, VA, VIA and VIIA; and p represents the moles of said anion or polyanion per mole of said $M_jX_p$;
  wherein said compound has a particle size of less than 1 micron and said compound has a surface area of at least 1 $m^2$/gm and wherein said compound is in a layered nanostructure with a coating on said compound and wherein said compound has the formula $LiMn_xCo_yNi_zO_2$ wherein x+y+z≤1.

10. The composition of claim 9 wherein said coating comprises alkali or alkaline earth metals, Group III A and IV A and transition metals.

11. The composition of claim 9 wherein said coating comprises an organic or inorganic compound.

12. The composition of claim 11 wherein said coating is a MjXp compound prepared by complexometric precursor formulation methodology.

13. The composition of claim 11 wherein said coating is a nanolayer.

14. The composition of claim 11 wherein said coating comprises carbon or a carbon-containing compound.

15. A battery comprising a compound $M_jX_p$ prepared by the complexometric precursor formulation methodology wherein:
  $M_j$ is at least one positive ion selected from the group consisting of alkali metals, alkaline earth metals and transition metals and j represents the moles of said positive ion per mole of said $M_jX_p$; and
  $X_p$ is an anion or polyanion selected from the group consisting of at least one anion or polyanion of Groups IIIA, IVA, VA, VIA and VIIA; and p represents the moles of said anion or polyanion per mole of said $M_jX_p$;
  wherein said compound has a particle size of less than 1 micron and said compound has a surface area of at least 1 $m^2$/gm and wherein said compound is in a layered nanostructure and wherein said compound has the formula $LiMn_xCo_yNi_zO_2$ wherein x+y+z≤1.

16. The battery of claim 15 wherein said compound is defined by the formula $Li_{2-x-y-z}Ni_xMn_yCo_zO_2$ wherein x+y+z≤1 and at least one of x, y or z is not zero.

17. The battery of claim 15 wherein said compound is $Li_{2-x-y-z}Ni_xMn_yCo_zO_2$ wherein x+y+z≤1 and none of x, y or z are zero.

18. The battery of claim 15 having a capacity of at least 80 mAh/g after 500 cycles at room temperature at a discharge rate of 1 C when discharged from 4.2 volts to 3 volts.

19. The battery of claim 15 having a capacity of 150 mAh/g after 500 cycles at room temperature at a discharge rate of 1 C when discharged from 4.6 volts to 2.5 volts.

20. A composition comprising a compound $M_jX_p$ prepared by the complexometric precursor formulation methodology wherein:
  $M_j$ is at least one positive ion selected from the group consisting of alkali metals, alkaline earth metals and transition metals and j represents the moles of said positive ion per mole of said $M_jX_p$; and
  $X_p$ is an anion or polyanion selected from the group consisting of at least one anion or polyanion of Groups IIIA, IVA, VA, VIA and VIIA; and p represents the moles of said anion or polyanion per mole of said $M_jX_p$;
  wherein said $M_j$ comprises $M_1$ and $M_2$ and wherein $M_1$ is lithium and $M_2$ is a transition metal and
  wherein said compound has a particle size of less than 50 microns, said compound has a surface area of at least 1 $m^2$/gm, said compound is in a layered nanostructure and wherein said compound has the formula $LiMn_xCo_yNi_zO_2$ wherein x+y+z≤1.

21. The composition comprising a compound $M_jX_p$ prepared by the complexometric precursor formulation methodology of claim 20 wherein said compound has a particle size of 100 to 300 nm.

* * * * *